United States Patent
Choi et al.

(10) Patent No.: US 7,903,758 B2
(45) Date of Patent: *Mar. 8, 2011

(54) DIGITAL TELEVISION TRANSMITTING SYSTEM AND RECEIVING SYSTEM AND METHOD OF PROCESSING BROADCAST DATA

(75) Inventors: In Hwan Choi, Gyeonggi-do (KR); Kook Yeon Kwak, Gyeonggi-do (KR); Byoung Gill Kim, Seoul (KR); Jin Woo Kim, Seoul (KR); Hyoung Gon Lee, Seoul (KR); Jong Moon Kim, Seoul (KR); Won Gyu Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,463

(22) Filed: Aug. 5, 2010

(65) Prior Publication Data

US 2010/0296006 A1    Nov. 25, 2010

Related U.S. Application Data

(63) Continuation of application No. 11/760,656, filed on Jun. 8, 2007, now Pat. No. 7,839,950.

(60) Provisional application No. 60/884,200, filed on Jan. 9, 2007.

(30) Foreign Application Priority Data

Jun. 9, 2006    (KR) .................. 10-2006-0052095

(51) Int. Cl.
  *H04L 25/49*    (2006.01)
(52) U.S. Cl. ............... 375/296; 375/265; 375/E7.013
(58) Field of Classification Search ................. 375/265, 375/285, 296, E7.002, E7.013
  See application file for complete search history.

(56) References Cited

U.S. PATENT DOCUMENTS 6,829,741 B1 * 12/2004  Khansari et al. ............. 714/755
2004/0090997 A1  5/2004  Choi et al.

FOREIGN PATENT DOCUMENTS

| WO | 2005-071958 | 8/2005 |
| WO | 2005-109878 | 11/2005 |
| WO | 2005-120062 | 12/2005 |

* cited by examiner

*Primary Examiner* — Shuwang Liu
*Assistant Examiner* — David Huang
(74) *Attorney, Agent, or Firm* — Lee, Hong, Degerman, Kang & Waimey

(57) ABSTRACT

A digital television receiving system includes a first known data detector, a second known data detector, and a selector. The first known data detector detects a location of a first known data sequence in a broadcast signal by calculating a first correlation value between the broadcast signal and a first reference known data sequence. Similarly, the second known data detector detects a location of a second known data sequence in the broadcast signal by calculating a second correlation value between the broadcast signal and a second reference known data sequence. The selector selects the location information detected by one of the first and second known data detectors with a greater correlation value.

8 Claims, 11 Drawing Sheets

| c2c1c0 | 8VSB Level |
|--------|------------|
| 000 | -7 |
| 001 | -5 |
| 010 | -3 |
| 011 | -1 |
| 100 | +1 |
| 101 | +3 |
| 110 | +5 |
| 111 | +7 |

FIG. 7

| m1m0 | 1st d0/2nd d0 |
|---|---|
| 00 | 0/0 |
| 01 | 0/1 |
| 10 | 1/0 |
| 11 | 1/1 |

FIG. 8

| m2m1m0 | 1st d1d0/2nd d1d0 |
|---|---|
| 000 | 00/00 or 10/10 |
| 001 | 00/01 or 10/11 |
| 010 | 01/00 or 11/10 |
| 011 | 01/01 or 11/11 |
| 100 | 00/10 or 10/00 |
| 101 | 00/11 or 10/01 |
| 110 | 01/10 or 11/00 |
| 111 | 01/11 or 11/01 |

DIGITAL TELEVISION TRANSMITTING SYSTEM AND RECEIVING SYSTEM AND METHOD OF PROCESSING BROADCAST DATA

This application is a continuation of U.S. application Ser. No. 11/760,656, filed on Jun. 8, 2007, now U.S. Pat. No. 7,839,950, which claims the benefit of Korean Patent Application No. 10-2006-0052095, filed on Jun. 9, 2006 and the benefit of U.S. Provisional Application No. 60/884,200, filed on Jan. 9, 2007, which are all hereby incorporated by reference herein in their entirety.

BACKGROUND OF THE INVENTION

1. Field of the Invention

The present invention relates to digital television (DTV) systems and methods of processing broadcast data.

2. Discussion of the Related Art

Presently, the technology for processing digital signals is being developed at a vast rate, and, as a larger number of the population uses the Internet, digital electric appliances, computers, and the Internet are being integrated. Therefore, in order to meet with the various requirements of the users, a system that can transmit diverse supplemental information in addition to video/audio data through a digital television channel needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the video/audio data. However, with the advent of digital broadcasting, digital television receiving systems that receive only video/audio data are already supplied to the market. Therefore, the supplemental data that are transmitted through the same channel as the video/audio data should not influence the conventional receiving systems that are provided in the market. In other words, this may be defined as the compatibility of broadcast system, and the supplemental data broadcast system should be compatible with the broadcast system. Herein, the supplemental data may also be referred to as enhanced data. Furthermore, in a poor channel environment, the receiving performance of the conventional receiving system may be deteriorated. More specifically, resistance to changes in channels and noise is more highly required when using portable and/or mobile receiving systems.

SUMMARY OF THE INVENTION

Accordingly, the present invention is directed to a DTV transmitting system and a DTV receiving system and a method of processing broadcast data that substantially obviate one or more problems due to limitations and disadvantages of the related art.

An object of the present invention is to provide a DTV transmitting system and a DTV receiving system and a method of processing broadcast data that are highly resistant to channel changes and noise.

Another object of the present invention is to provide a DTV transmitting system and a DTV receiving system and a method of processing broadcast data that can efficiently initialize a memory of a trellis encoder in order to enhance the receiving performance of a receiving system.

A further object of the present invention is to provide a DTV transmitting system and a DTV receiving system and a method of processing broadcast data that can detect known data being trellis-encoded and transmitted and that can use the detected known data on frequency synchronization so as to enhance the receiving performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) transmitting system includes a pre-processor, a multiplexer, a first Reed-Solomon (RS) encoder, a trellis encoding module, a second Reed-Solomon (RS) encoder, and a parity replacer. The pre-processor pre-processes enhanced data and outputs enhanced data packets including a known data sequence. The multiplexer multiplexes the enhanced data packets with main data packets. The first RS encoder performs RS encoding on the multiplexed data packets by adding systematic parity data to each main data packet and adding first non-systematic parity data to each enhanced data packet. The trellis encoding module performs trellis encoding on the RS-encoded data packets. In addition, the trellis encoding module generates initialization data to initialize at least one of memories when the known data sequence is inputted into the trellis encoding module from the first RS encoder.

The second RS encoder receives an enhanced data packet including the known data sequence from the first RS encoder and removes the first parity data from the received enhanced data packet. Thereafter, the second RS encoder replaces a portion of the known data sequence with the initialization data and generates second non-systematic parity data based on the enhanced data packet including the replaced initialization data. Finally, the parity replacer receives an enhanced data packet including the known data sequence from the first RS encoder and replaces the first parity data in the received enhanced data packet with the second parity data generated by the second RS encoder.

In another aspect of the present invention, a digital television (DTV) receiving system includes a first known data detector, a second known data detector, and a selector. The first known data detector detects a location of a first known data sequence in a broadcast signal by calculating a first correlation value between the broadcast signal and a first reference known data sequence. Similarly, the second known data detector detects a location of a second known data sequence in the broadcast signal by calculating a second correlation value between the broadcast signal and second reference known data sequence. The detector then selects the location information detected by one of the first and second known data detectors with a greater correlation value. The first reference known data sequence is a known data sequence generated based on a assumption that an initial state of a memory included in a trellis encoder of a digital television (DTV) transmitting system for pre-coding is set to 0, and the second reference known data sequence is a known data sequence generated based on an assumption that the initial state of the memory is set to 1.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates an input symbol for initializing a memory within the trellis encoder of FIG. 4 according to an embodiment of the present invention;

FIG. 8 illustrates an input symbol for initializing a memory within the trellis encoder of FIG. 4 according to another embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, weather forecast, and so on, or consist of video/audio data. Additionally, the known data refer to data already known based upon a pre-determined agreement between the transmitting system and the receiving system. Furthermore, the main data consist of data that can be received from the conventional receiving system, wherein the main data include video/audio data. The present invention relates to a method of inserting known data and initializing a memory of a trellis encoder in a digital broadcast receiving system, and to a method of detecting known data in a digital broadcast transmitting system.

Figure 1:
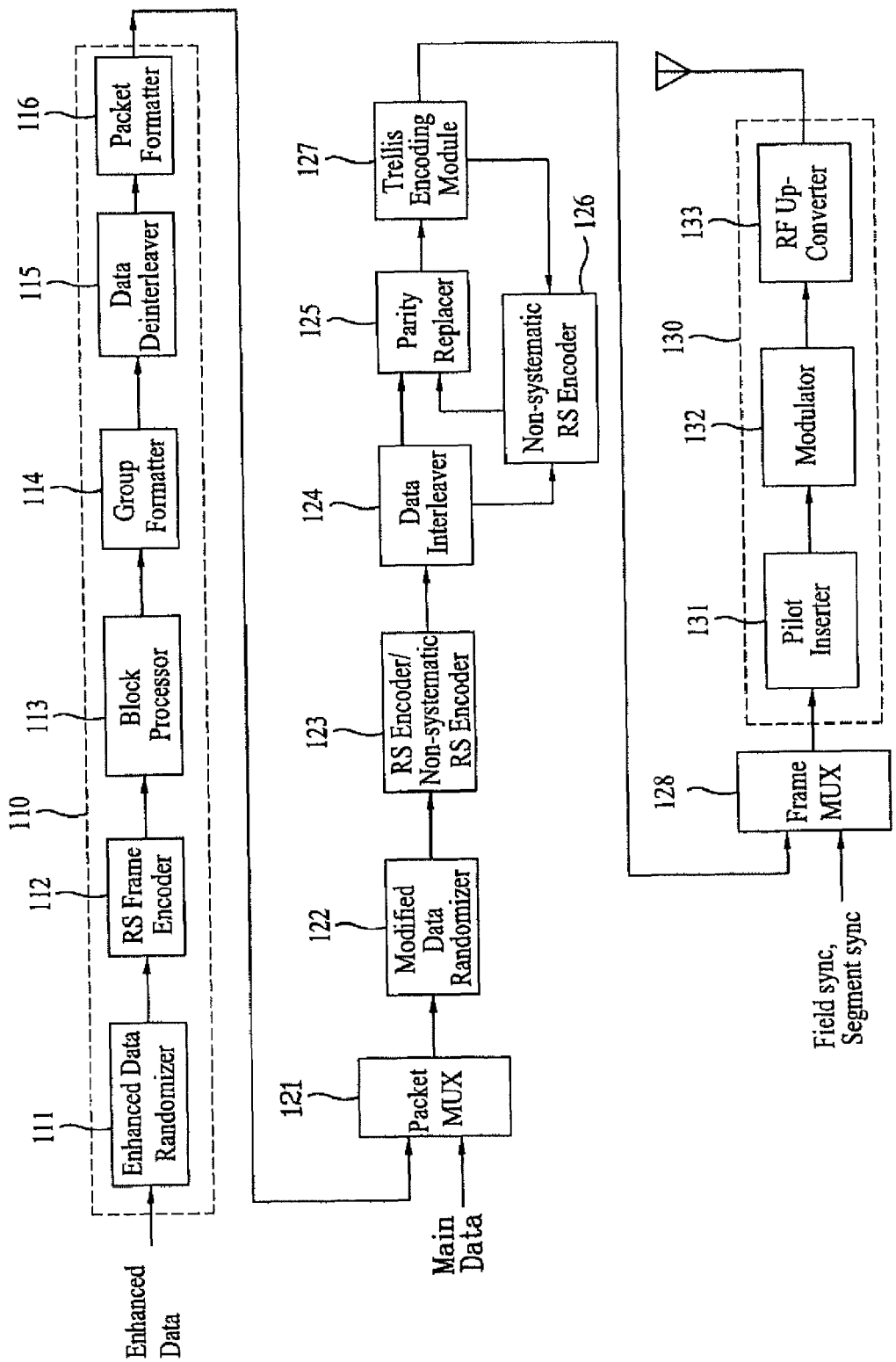
FIG. 1 illustrates a block diagram of a digital broadcast transmitting system according to an embodiment of the present invention.

FIG. 1 illustrates an example of a digital broadcast transmitting system according to the present invention for inserting and transmitting known data. The transmitting system of FIG. 1 is merely exemplary proposed to facilitate the understanding of the present invention. Herein, any transmitting system that requires the transmission of transmission parameters may be adopted in the present invention. Therefore, the present invention is not limited to the example proposed in the description set forth herein.

The digital broadcast transmitting system of FIG. 1 includes a pre-processor 110, a packet multiplexer 121, a data randomizer 122, a RS encoder/non-systematic RS encoder 123, a data interleaver 124, a parity replacer 125, a non-systematic RS encoder 126, a trellis-encoding module 127, a frame multiplexer 128, and a transmitting unit 130. The pre-processor 110 includes a randomizer 111, a RS frame encoder 112, a block processor 113, a group formatter 114, a data deinterleaver 115, and a packet formatter 116. In the above-described structure of the present invention, the main data are inputted to the packet multiplexer 121, and the enhanced data are inputted to the pre-processor 110, which performs additional encoding so that the enhanced data can respond more effectively to noise and channel environment that undergoes frequent changes.

The randomizer 111 of the pre-processor 110 receives enhanced data and randomizes the received data, thereby outputting the processed enhanced data to the RS frame encoder 112. Then, the randomizer 111 randomizes the received enhanced data and performs byte expansion on the randomized enhanced data by inserting null data. At this point, by having the randomizer 111 randomize the enhanced data, a later randomizing process on the enhanced data performed by a randomizer 122, which is positioned in a later block, may be omitted. The randomizer of the conventional ATSC system may be identically used as the randomizer for randomizing the enhanced data. Alternatively, any other type of randomizer may also be used for this process.

The RS frame encoder 112 receives the randomized enhanced data so as to configure a frame for additional encoding. Then, the RS frame encoder 112 encodes the newly configured frame which is then outputted to the block process 113. For example, the RS frame encoder 112 performs at least one of an error correction encoding process and an error detection encoding process on the inputted enhanced data so as to provide robustness on the corresponding data. Herein, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated. Furthermore, by scattering a group error that may occur due to a change in the frequency environment, the RS frame encoder 112 may also perform a row permutation process, which permutes enhanced data having a predetermined size in row units, so that the corresponding data can respond to the severely vulnerable and frequently changing frequency environment.

The block processor 113 encodes the enhanced data outputted from the RS frame encoder 112 at a coding rate of M/N and transmits the encoded data to the group formatter 114. For example, if 1 bit of the enhanced data is encoded to 2 bits and outputted, then M is equal to 1 and N is equal to 2 (i.e., M=1 and N=2). Alternatively, if 1 bit of the enhanced data is encoded to 4 bits and outputted, then M is equal to 1 and N is equal to 4 (i.e., M=1 and N=4).

The group formatter 114 inserts the enhanced data outputted from the block processor 113 (herein, the enhanced data may include supplemental information data such as signaling information including transmission information) in a corresponding area within the data group, which is configured according to a pre-defined rule. Furthermore, in relation with the data deinterleaving process, various types of places holders or known data are also inserted in corresponding areas within the data group.

At this point, the data group may be described by at least one hierarchical area. Herein, the data allocated to the each area may vary depending upon the characteristic of each hierarchical area. Additionally, each data group may be configured to include a field synchronization signal.

In an example given in the present invention, a data group is divided into A, B, and C regions in a data configuration prior to data deinterleaving.

Figure 2:
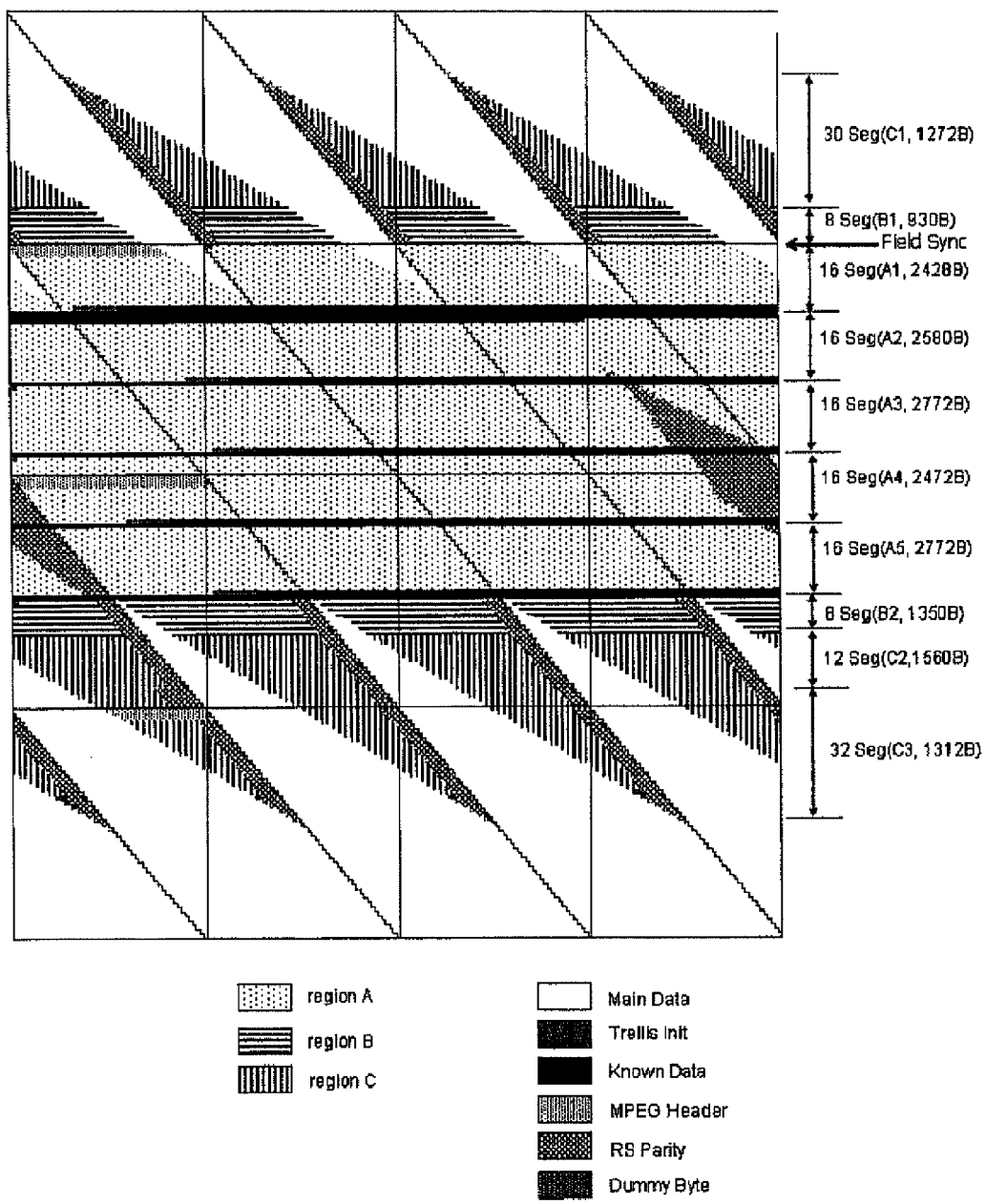
FIG. 2 and FIG. 3 illustrate another examples of data configuration at before and after ends of a data deinterleaver in a transmitting system according to the present invention.
Figure 3:
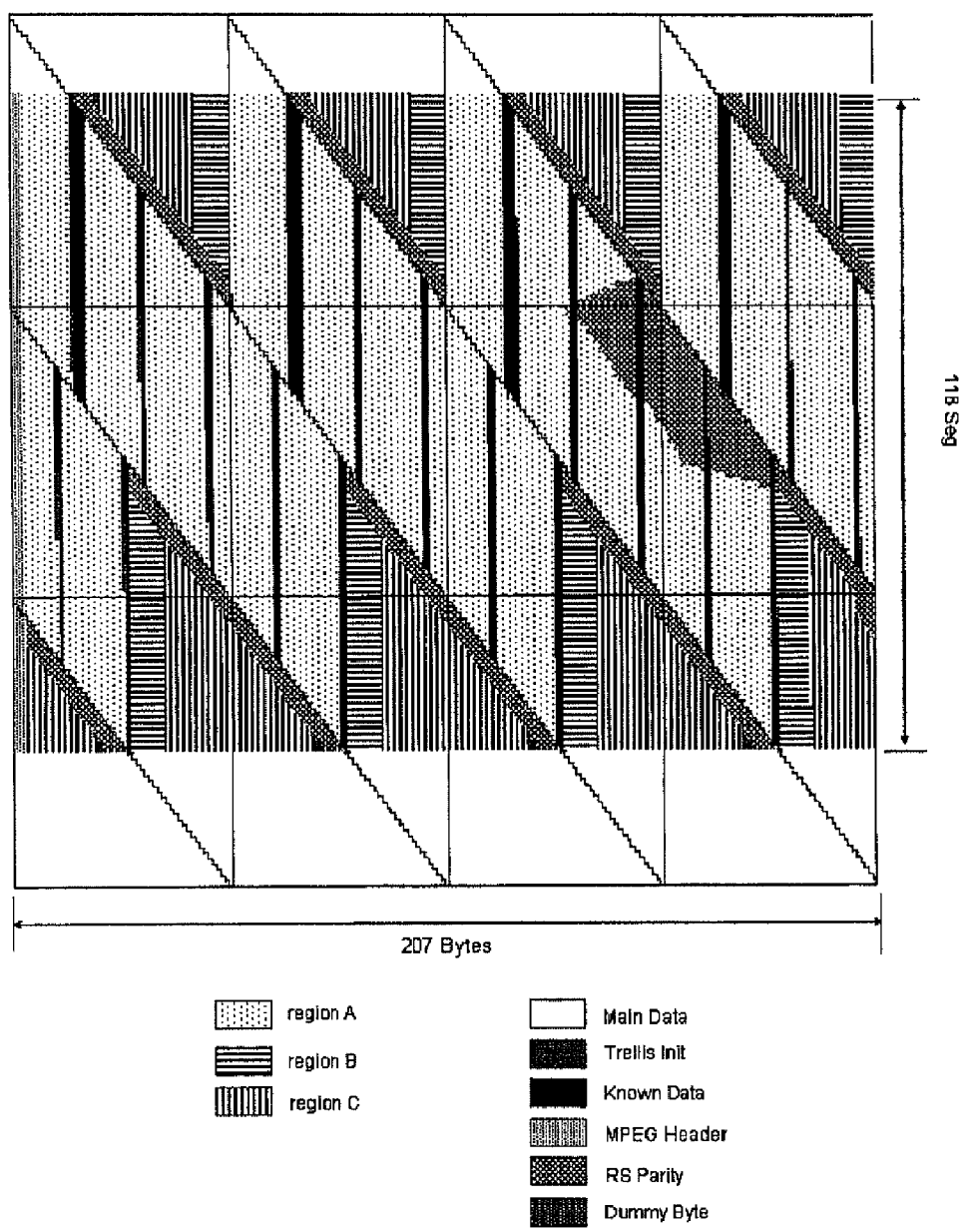

FIG. 2 illustrates an alignment of data after being data interleaved and identified, and FIG. 3 illustrates an alignment of data before being data interleaved and identified. More specifically, a data structure identical to that shown in FIG. 2 is transmitted to a receiving system. Also, the data group configured to have the same structure as the data structure shown in FIG. 2 is inputted to the data deinterleaver 115.

As described above, FIG. 2 illustrates a data structure prior to data deinterleaving that is divided into 3 regions, such as region A, region B, and region C. Also, in the present invention, each of the regions A to C is further divided into a plurality of regions. Referring to FIG. 2, region A is divided into 5 regions (A1 to A5), region B is divided into 2 regions (B1 and B2), and region C is divided into 3 regions (C1 to C3). Herein, regions A to C are identified as regions having similar receiving performances within the data group. Herein, the type of enhanced data, which are inputted, may also vary depending upon the characteristic of each region.

In the example of the present invention, the data structure is divided into regions A to C based upon the level of interference of the main data. Herein, the data group is divided into a plurality of regions to be used for different purposes. More specifically, a region of the main data having no interference or a very low interference level may be considered to have a more resistant (or stronger) receiving performance as compared to regions having higher interference levels. Additionally, when using a system inserting and transmitting known data in the data group, and when consecutively long known data are to be periodically inserted in the enhanced data, the known data having a predetermined length may be periodically inserted in the region having no interference from the main data (e.g., region A). However, due to interference from the main data, it is difficult to periodically insert known data and also to insert consecutively long known data to a region having interference from the main data (e.g., region B and region C).

Hereinafter, examples of allocating data to region A (A1 to A5), region B (B1 and B2), and region C (C1 to C3) will now be described in detail with reference to FIG. 2. The data group size, the number of hierarchically divided regions within the data group and the size of each region, and the number of enhanced data bytes that can be inserted in each hierarchically divided region of FIG. 2 are merely examples given to facilitate the understanding of the present invention. Herein, the group formatter 114 creates a data group including places in which field synchronization bytes are to be inserted, so as to create the data group that will hereinafter be described in detail.

More specifically, region A is a region within the data group in which a long known data sequence may be periodically inserted, and in which includes regions wherein the main data are not mixed (e.g., A1 to A5). Also, region A includes a region (e.g., A1) located between a field synchronization region and the region in which the first known data sequence is to be inserted. The field synchronization region has the length of one segment (i.e., 832 symbols) existing in an ATSC system.

For example, referring to FIG. 2, 2428 bytes of the enhanced data may be inserted in region A1, 2580 bytes may be inserted in region A2, 2772 bytes may be inserted in region A3, 2472 bytes may be inserted in region A4, and 2772 bytes may be inserted in region A5. Herein, trellis initialization data or known data, MPEG header, and RS parity are not included in the enhanced data. As described above, when region A includes a known data sequence at both ends, the receiving system uses channel information that can obtain known data or field synchronization data, so as to perform equalization, thereby providing enforced equalization performance.

Also, region B includes a region located within 8 segments at the beginning of a field synchronization region within the data group (chronologically placed before region A1) (e.g., region B1), and a region located within 8 segments behind the very last known data sequence which is inserted in the data group (e.g., region B2). For example, 930 bytes of the enhanced data may be inserted in the region B1, and 1350 bytes may be inserted in region B2. Similarly, trellis initialization data or known data, MPEG header, and RS parity are not included in the enhanced data. In case of region B, the receiving system may perform equalization by using channel information obtained from the field synchronization section. Alternatively, the receiving system may also perform equalization by using channel information that may be obtained from the last known data sequence, thereby enabling the system to respond to the channel changes.

Region C includes a region located within 30 segments including and preceding the $9^{th}$ segment of the field synchronization region (chronologically located before region A) (e.g., region C1), a region located within 12 segments including and following the $9^{th}$ segment of the very last known data sequence within the data group (chronologically located after region A) (e.g., region C2), and a region located in 32 segments after the region C2 (e.g., region C3). For example, 1272 bytes of the enhanced data may be inserted in the region C1, 1560 bytes may be inserted in region C2, and 1312 bytes may be inserted in region C3. Similarly, trellis initialization data or known data, MPEG header, and RS parity are not included in the enhanced data. Herein, region C (e.g., region C1) is located chronologically earlier than (or before) region A.

Since region C (e.g., region C1) is located further apart from the field synchronization region which corresponds to the closest known data region, the receiving system may use the channel information obtained from the field synchronization data when performing channel equalization. Alternatively, the receiving system may also use the most recent channel information of a previous data group. Furthermore, in region C (e.g., region C2 and region C3) located before region A, the receiving system may use the channel information obtained from the last known data sequence to perform equalization. However, when the channels are subject to fast and frequent changes, the equalization may not be performed perfectly. Therefore, the equalization performance of region C may be deteriorated as compared to that of region B.

When it is assumed that the data group is allocated with a plurality of hierarchically divided regions, as described above, the block processor 113 may encode the enhanced data, which are to be inserted to each region based upon the characteristic of each hierarchical region, at a different coding rate. For example, the block processor 113 may encode the enhanced data, which are to be inserted regions A1 to A5 of region A, at a coding rate of 1/2. Then, the group formatter 114 may insert the 1/2-rate encoded enhanced data to regions A1 to A5.

The block processor 113 may encode the enhanced data, which are to be inserted in regions B1 and B2 of region B, at a coding rate of 1/4 having higher error correction ability as compared to the 1/2-coding rate. Then, the group formatter 114 inserts the 1/4-rate coded enhanced data in region B1 and region B2. Furthermore, the block processor 113 may encode the enhanced data, which are to be inserted in regions C1 to C3 of region C, at a coding rate of 1/4 or a coding rate having higher error correction ability than the 1/4-coding rate. Then, the group formatter 114 may either insert the encoded enhanced data to regions C1 to C3, as described above, or leave the data in a reserved region for future usage.

In addition, the group formatter 114 also inserts supplemental data, such as signaling information that notifies the overall transmission information, other than the enhanced data in the data group. Also, apart from the encoded enhanced data outputted from the block processor 113, the group formatter 114 also inserts MPEG header place holders, non-systematic RS parity place holders, main data place holders, which are related to data deinterleaving in a later process, as shown in FIG. 2. Herein, the main data place holders are inserted because the enhanced data bytes and the main data bytes are alternately mixed with one another in regions B and C based upon the input of the data deinterleaver, as shown in FIG. 2. For example, based upon the data outputted after data deinterleaving, the place holder for the MPEG header may be allocated at the very beginning of each packet.

Furthermore, the group formatter 114 either inserts known data generated in accordance with a pre-determined method or inserts known data place holders for inserting the known data in a later process. Additionally, place holders for initializing the trellis encoder 127 are also inserted in the corresponding regions. For example, the initialization data place holders may be inserted in the beginning of the known data sequence. Herein, the size of the enhanced data that can be inserted in a data group may vary in accordance with the sizes of the trellis initialization place holders or known data (or known data place holders), MPEG header place holders, and RS parity place holders.

The output of the group formatter 114 is inputted to the data deinterleaver 115. And, the data deinterleaver 115 deinterleaves data by performing an inverse process of the data interleaver on the data and place holders within the data group, which are then outputted to the packet formatter 116. More specifically, when the data and place holders within the data group configured, as shown in FIG. 2, are deinterleaved by the data deinterleaver 115, the data group being outputted to the packet formatter 116 is configured to have the structure shown in FIG. 3.

Among the data deinterleaved and inputted, the packet formatter 116 removes the main data place holder and RS parity place holder that were allocated for the deinterleaving process from the inputted deinterleaved data. Thereafter, the remaining portion of the corresponding data is grouped, and 4 bytes of MPEG header are inserted therein. The 4-byte MPEG header is configured of a 1-byte MPEG synchronization byte added to the 3-byte MPEG header place holder.

When the group formatter 114 inserts the known data place holder, the packet formatter 116 may either insert actual known data in the known data place holder or output the known data place holder without any change or modification for a replacement insertion in a later process. Afterwards, the packet formatter 116 divides the data within the above-described packet-formatted data group into 188-byte unit enhanced data packets (i.e., MPEG TS packets), which are then provided to the packet multiplexer 121.

The packet multiplexer 121 multiplexes the 188-byte unit enhanced data packet and main data packet outputted from the packet formatter 116 according to a pre-defined multiplexing method. Subsequently, the multiplexed data packets are outputted to the data randomizer 122. The multiplexing method may be modified or altered in accordance with diverse variables of the system design. One of the multiplexing methods of the packet multiplexer 121 is to identify an enhanced data burst section and a main data section along a time axis and alternately repeating the two sections. At this point, at least one data group may be transmitted from the enhanced data burst section, and only the main data may be transmitted from the main data section. Herein, the enhanced data burst section may also transmit main data.

As described above, if the enhanced data are transmitted in the burst structure, the receiving system receiving only the enhanced data turns the power on only during the burst section in order to receive the enhanced data. Alternatively, the receiving system turns the power off during the remaining section, which corresponds to the main data section transmitting only the main data, so that the receiving system does not receive any portion of the main data. Thus, power consumption of the receiving system may be reduced.

If the inputted data correspond to the main data packet, the data randomizer 122 performs the same randomizing process as the conventional randomizer. More specifically, the data randomizer 122 discards (or removes) the MPEG synchronization byte included in the main data packet and randomizes the remaining 187 byte by using a pseudo random byte that is generated by the data randomizer 122. Then, the randomized data bytes are outputted to the RS encoder/non-systematic RS encoder 123. However, if the inputted data correspond to the enhanced data packet, the data randomizer 522 discards (or removes) the MPEG synchronization byte from the 4-byte MPEG header included in the enhanced data packet and randomizes only the remaining 3 bytes. Also, the data randomizer 122 outputs the remaining portion of enhanced data excluding the MPEG header to the RS encoder/non-systematic RS encoder 123 without performing the randomizing process. This is because the randomizer 111 has already performed a randomizing process on the enhanced data in an earlier process. The known data and the initialization data place holders included in the enhanced data packet may either be randomized or not be randomized.

The RS encoder/non-systematic RS encoder 123 RS-encodes the data randomized by the data randomizer 122 or the data bypassing the data randomizer 122 so as to add 20 bytes of RS parity to the corresponding data. Then, the RS encoder/non-systematic RS encoder 123 outputs the processed data to the data interleaver 124. At this point, if the inputted data correspond to the main data packet, the RS encoder/non-systematic RS encoder 123 performs a systematic RS-encoding process identical to that of the conventional broadcasting system, thereby adding 20 bytes of RS parity at the end of the 187-byte unit data. Alternatively, if the inputted data correspond to the enhanced data packet, the RS encoder/non-systematic RS encoder 123 performs a non-systematic RS-encoding process at a specific parity byte place within the enhanced data packet, thereby inserting the 20-byte RS parity. Herein, the data interleaver 124 corresponds to a byte unit convolutional interleaver. The output of the data interleaver 124 is inputted to the parity replacer 125 and the non-systematic RS encoder 126.

Meanwhile, a process of initializing a memory within the trellis-encoding module 127 is primarily required in order to decide the output data of the trellis-encoding module 127, which is located after the parity replacer 125, as the known data pre-defined according to an agreement between the receiving system and the transmitting system. More specifically, the memory of the trellis-encoding module 127 should first be initialized before the received known data sequence is trellis-encoded. The memory of the trellis-encoding module 127 is initialized because various types of sequences may be outputted depending upon the memory status of the trellis-encoding module 127, even though the known data sequence is inputted to the trellis-encoding module 127.

At this point, the beginning portion of the known data sequence that is being received corresponds to the initialization data place holder and not the actual known data. Herein, the initialization data place holder has been included in the data by the group formatter 114 in an earlier process. Therefore, the process of generating initialization data and replacing the initialization data place holder of the corresponding memory with the generated initialization data are required to be performed immediately before the known data sequence being inputted is trellis-encoded.

Additionally, a value of the initialization data is decided and generated based upon a memory status of the trellis-encoding module 127. Further, due to the newly replaced initialization data, a process of newly calculating the RS parity and replacing the RS parity, which is outputted from the data interleaver 124, with the newly calculated RS parity is required. Therefore, the non-systematic RS encoder 126 receives the enhanced data packet including the initialization data place holder, which is to be replaced with the actual initialization data, from the data interleaver 124 and also receives the initialization data from the trellis-encoding module 127. Among the inputted enhanced data packet, the initialization data place holder is replaced with the initialization data, and the RS parity data that are added to the enhanced data packet are removed. Thereafter, a new non-systematic RS parity is calculated and outputted to the parity replacer 125. Accordingly, the parity replacer 125 selects the output of the data interleaver 124 as the data within the enhanced data packet, and the parity replacer 125 selects the output of the non-systematic RS encoder 126 as the RS parity. The selected data are then outputted to the trellis-encoding module 127.

Meanwhile, if the main data packet is inputted or if the enhanced data packet, which does not include any initialization data place holder that is to be replaced, is inputted, the parity replacer 125 selects the data and RS parity that are outputted from the data interleaver 124. Then, the parity replacer 125 directly outputs the selected data to the trellis-encoding module 127 without any modification. The trellis-encoding module 127 receives the output data of the parity replacer 125 or the initialization data and converts the received data to symbol units. Then, the trellis-encoding module 127 pre-codes the upper bit of the converted symbol and trellis-encodes the lower bit of the converted symbol. Thereafter, trellis-encoding module 127 outputs the processed data to the frame multiplexer 128. The operation of the trellis-encoding module 127 will be described in more detail in a later process.

The frame multiplexer 128 inserts a field synchronization signal and a segment synchronization signal to the data outputted from the trellis-encoding module 127 and, then, outputs the processed data to the transmitting unit 130. Herein, the transmitting unit 130 includes a pilot inserter 131, a modulator 132, and a radio frequency (RF) up-converter 133. The operations and roles of the transmitting unit 130 and its components are identical to those of the conventional transmitter. Therefore, detailed description of the same will be omitted for simplicity.

Trellis-Encoding

Figure 4:
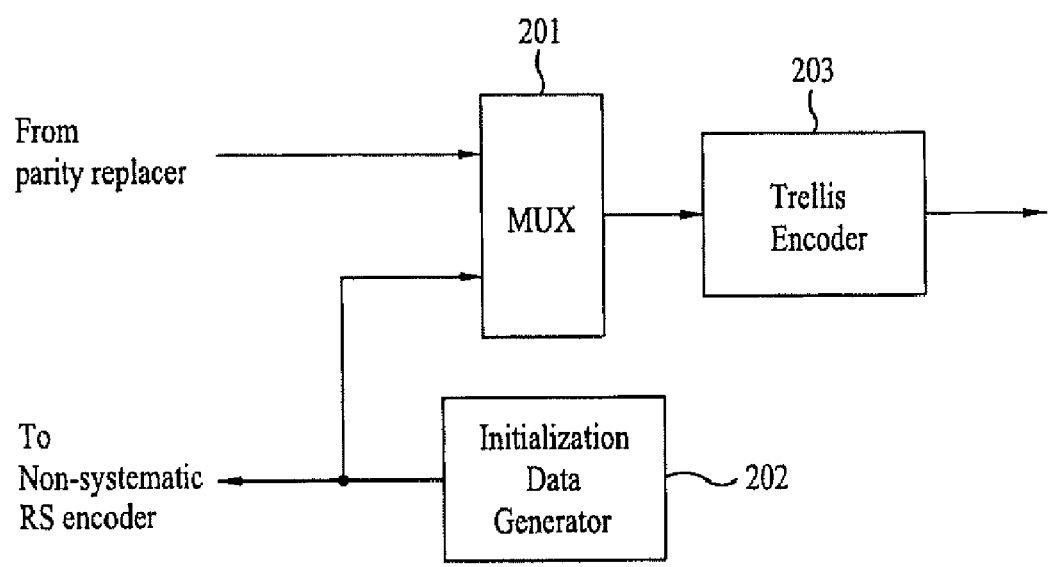
FIG. 4 illustrates a detailed block diagram of a trellis-encoding module shown in FIG. 1.

FIG. 4 illustrates a detailed block diagram of a trellis-encoding module 127, which can be initialized. Herein, when a known data symbol sequence in inputted, the memory within the trellis-encoding module 127 is initialized so that the trellis-encoded known data symbol sequence becomes the desired known data symbol sequence. In order to do so, the trellis-encoding module 127 includes a multiplexer 201, an initialization data generator 202, and a trellis encoder 203.

Referring to FIG. 4, in the trellis-encoding module 127 having the above-described structure, when initialization of the memory within the trellis-encoding module 127 is required, the initialization data generator 202 generates data required for the initialization process based upon a value of the memory within the trellis encoder 203. Thereafter, the initialization data generator 202 outputs the generated initialization data to the multiplexer 201 and a non-systematic RS encoder 126. More specifically, of the data being inputted for the trellis-encoding process correspond to initialization data place holders (or the beginning of the known data sequence), the initialization data generator 202 generates the initialization data.

The multiplexer 201 selects one of the output data of the parity replacer 125 and the initialization data of the initialization data generator 202. Then, the multiplexer 201 outputs the selected data to the trellis encoder 203. More specifically, when the memory of the trellis encoder 203 is required to be initialized, the initialization data are outputted to the trellis encoder 203 instead of the initialization data place holders (or the beginning of the known data sequence) outputted from the parity replacer 125. Accordingly, the memory within the trellis encoder 203 is initialized to the value decided by the initialization data. Then, from the point (or moment) the memory of the trellis encoder 203 is initialized, the data outputted from the trellis encoder 203 may become a known data sequence encoded to have a data format (or configuration) desired by the transmitting system and the receiving system.

Figures 5, 6:
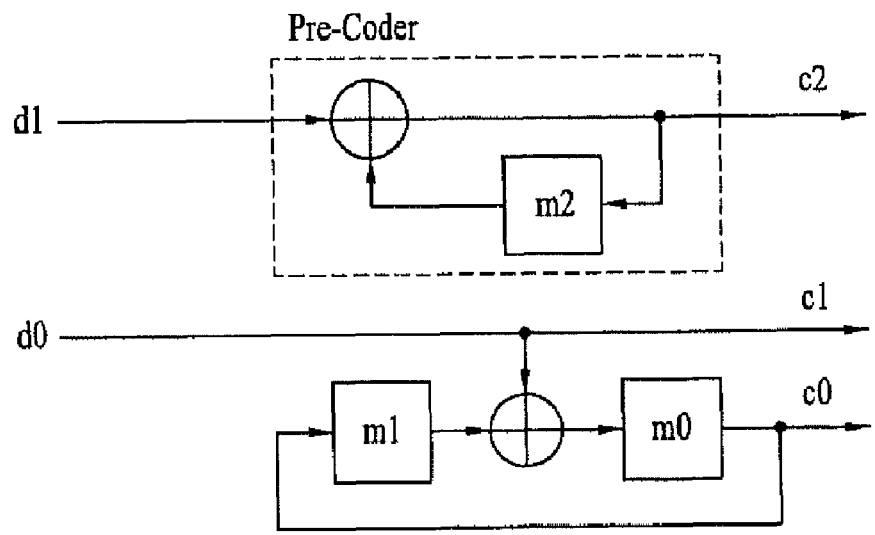
FIG. 5 and FIG. 6 respectively illustrate a trellis encoder and a mapper shown in FIG. 4.

FIG. 5 and FIG. 6 respectively illustrate the trellis encoder 203 according to an embodiment of the present invention. Herein, the output data of the parity replacer 125 or the initialization data are trellis-encoded in symbol units. Each symbol is configured of 2 bits. More specifically, an upper bit d1 of the input symbol is pre-coded by using a memory m2 and an adder of a pre-coder, as shown in FIG. 5 and FIG. 6, so as to be outputted as c2. A lower bit d0 of the input symbol is trellis-encoded by using memories m1 and m0 and an adder, so as to be outputted as c1 and c0. The output c2c1c0 of the trellis encoder 203 corresponds to an 8-level signal, as shown in FIG. 6, which is mapped to a VSB signal and outputted to a frame multiplexer 128.

Therefore, the memory m2 of the trellis encoder 203 is decided only based upon d1, and the memories m1 and m0 are decided only based upon do. In other words, the upper bit c2 of the output data of the trellis encoder 203 is decided based upon the memory m2 within the pre-coder and the upper input bit d1, and the two lower bits c1 and c0 are decided based upon the memories m1 and m0 and the lower input bit d0. The present invention will now be described in detail in accordance with first and second embodiments of the present invention. The first and second embodiments respectively describe an example of initializing only memories m1m0 and an example of initializing all memories m2m1m0.

First Embodiment

When the memory m2 of the pre-coder within the trellis encoder 203 is not initialized, and when only the remaining two memories m1 and m0 are initialized, regardless of whether known data are inputted after the initialization process, only the two lower bits c1 and c0 among the 3 bits outputted from the trellis encoder 203 correspond to the known data. And, the one upper bit c2 may have two different values depending upon the status of the memory m2 within the pre-coder. FIG. 7 illustrates the output data of the initialization data generator 202, when initializing the memories m1 and m0 of the trellis encoder 203. More specifically, FIG. 7 illustrates the input data of two symbol sections that are to be initialized to '00', when each of the memories m1 and m0 of the trellis encoder 203 is in an arbitrary status. For example, when the memory status corresponds to m1m0=11, the input bit d0 should be consecutively inputted as '1' and '1' in order to initialize the memory to '00'. In this case, the initialization data generator 202 generates data required for the initialization process based upon the value of the memory m1m0 of the trellis encoder 203. At this point, if the memory m1m0 of the trellis encoder 203 is to be initialized to a status other than '00', two symbol sequences that are different from those shown in FIG. 7 are required. Since these two different symbol sequences may be easily deduced, a detailed description of the same will be omitted for simplicity.

As described above, when only the memories m1 and m0 of the trellis encoder 203 are initialized to a decided value, if a known data symbol sequence is inputted to the trellis encoder 203, c1 and c0 still remain as known data. However, c2 may be modified (or changed) in accordance with the value of the memory m2 within the pre-coder. Since the pre-coder is configured to have a feed-back structure, even though an identical d1 of the data sequence is inputted, the data sequence of the outputted data may become opposite to one another if the starting point is not the same.

The operation of the pre-coder will now be described in detail. When an initial state of the memory m2 within the pre-coder corresponds to '0', and when 100111 is inputted as the data sequence of input bit d1, the data sequence of the output c2 of the pre-coder becomes 111010. However, when the initial state of the memory m2 within the pre-coder corresponds to '1', and when 100111 is inputted as the data sequence of input bit d1, the data sequence of the output c2 of the pre-coder becomes 000101. More specifically, when the same data sequence is inputted to the pre-coder, and when the initial state of the memory m2 within the pre-coder is opposite to one another, the output c2 also becomes the opposite of one another. As a result, when the known data sequence is inputted, and when only the memories m1 and m0 of the trellis encoder 203 are initialized, two different symbol sequences may be outputted from the output data of the trellis encoder 203. And, at this point, only c2 of the two output symbol sequences is the opposite of one another, and c1 and c0 are identical to one another, respectively.

Therefore, the known data symbol being trellis-encoded and mapped to 8 levels may correspond to level +7 (c2c1c0=111) or level −1 (c2c1c0=011), or correspond to level +5 (c2c1c0=110) or level −3 (c2c1c0=010) or correspond to level +3 (c2c1c0=101) or level −5 (c2c1c0=001), or correspond to level +1 (c2c1c0=100) or level −7 (c2c1c0=000). More specifically, when c1c0 is equal to 00, the signal level being mapped to 8 different levels may only correspond to −7 and +1. As described above, depending upon the status of the memory m2 within the pre-coder, two different known data symbol sequences may be outputted from the trellis encoder 203. If one of the two known data symbol sequence corresponds to −7,+5,−5,+1,+7,+3,−1,−3, the other known data symbol sequence corresponds to +1,−3,+3,−7,−1,−5,+7,+5.

Second Embodiment

As shown in FIG. 5 and FIG. 6, in order to initialize the memory m2 of the trellis encoder 203 to a decided value, one d1 may be used. Alternatively, in order to initialize each of the memories m1 and m0 to a decided value, two d0s are required. Therefore, it is apparent that in order to initialize memories m2, m1, and m0 of the trellis encoder 203, at least two input symbols are required. FIG. 8 illustrates the output of the initialization data generator 202 when initializing the memories m2, m1, and m0 of the trellis encoder 203. More specifically, FIG. 8 illustrates the input data of two symbol sections that are to be initialized to '000', when each of the memories m2, m1, and m0 of the trellis encoder 203 is in an arbitrary status.

For example, when the memory status corresponds to m2m1m0=111, the input symbol d1d0 should be consecutively inputted either as '01' and '11' or as '11' and '01' in order to initialize the memory to '000'. In this case, the initialization data generator 202 generates data required for the initialization process based upon the value of the memory m2m1m0 of the trellis encoder 203. At this point, if the memory m2m1m0 of the trellis encoder 203 is to be initialized to a status other than '000', two symbol sequences that are different from those shown in FIG. B are required. Since these two different symbol sequences may be easily deduced, a detailed description of the same will be omitted for simplicity.

Receiving System

Figure 9:
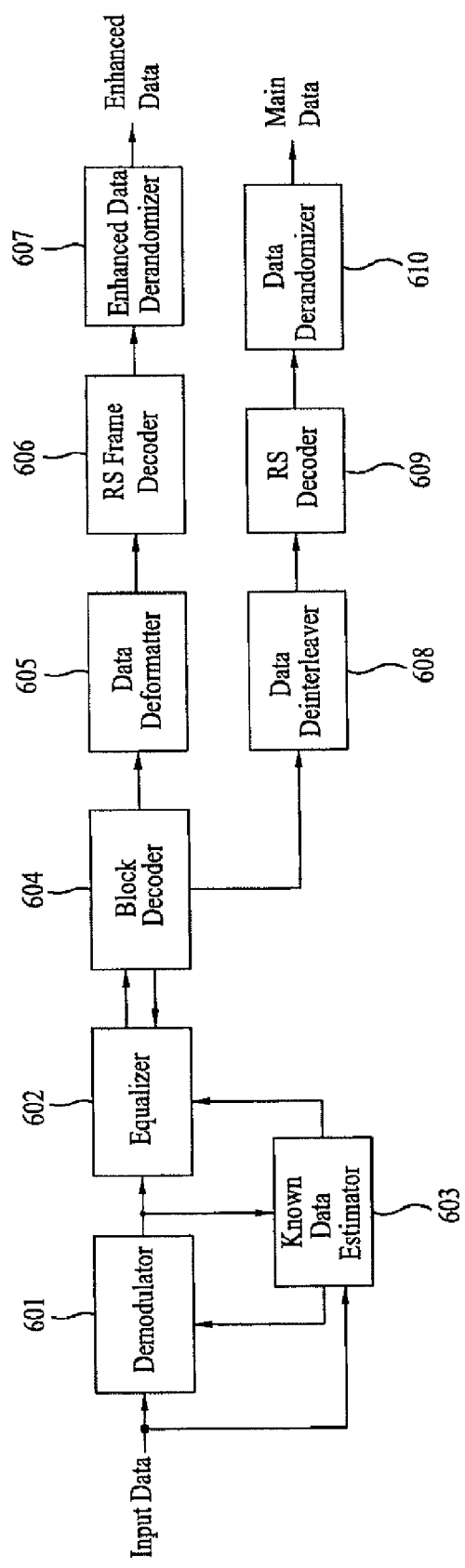
FIG. 9 illustrates a block diagram showing a structure of a demodulating unit within a digital broadcast receiving system according to an embodiment of the present invention.

FIG. 9 illustrates a block diagram showing a demodulating unit of a digital broadcast receiving system according to an embodiment of the present invention, wherein the demodulating unit is used for receiving data transmitted from the transmitting system, demodulating and equalizing the received data, so as to recover the processed data back to the initial (or original) data. Referring to FIG. 9, the demodulating unit of the digital broadcast receiving system includes a demodulator 601, an equalizer 602, a known data estimator 603, a block decoder 604, a data deformatter 605, a RS frame decoder 606, a derandomizer 607, a data deinterleaver 608, a RS decoder 609, and a data derandomizer 610.

More specifically, an intermediate frequency (IF) signal of a particular channel that is tuned by a tuner is inputted to the demodulator 601 and the known data detector 603. The demodulator 601 performs self gain control, carrier recovery, and timing recovery processes on the inputted IF signal, thereby modifying the IF signal to a baseband signal. Then, the demodulator 601 outputs the newly created baseband signal to the equalizer 602 and the known data estimator 603. The equalizer 602 compensates the distortion of the channel included in the demodulated signal and then outputs the error-compensated signal to the block decoder 604.

At this point, the known data estimator 603 detects the known sequence place inserted by the transmitting end from the input/output data of the demodulator 601 (i.e., the data prior to the demodulation or the data after the modulation). Thereafter, the known data place information is outputted to the demodulator 601 and the equalizer 602. Simultaneously, a coarse frequency offset is estimated and outputted to the demodulator 601. The processes of detecting the known data place and detecting the coarse frequency offset will be described in more detail in a later process.

Also, the known data estimator 603 outputs a set of information to the block decoder 604. This set of information is used to allow the block decoder 604 of the receiving system to identify the enhanced data that are processed with additional encoding from the transmitting system and the main data that are not processed with additional encoding. This set of information is also used to indicate a stating point of a block in the enhanced encoder. Also, the information detected from the known data estimator 603 may be used throughout the entire receiving system and may also be used by the data deformatter 605 and the RS frame decoder 606.

The demodulator 601 uses the known data during the timing and/or carrier recovery, thereby enhancing the demodulating performance. Similarly, the equalizer 602 uses the known data sequence, thereby enhancing the equalizing quality. Particularly, the demodulator 601 may use the known data place information and the estimated value of the coarse frequency offset both outputted from the known data estimator 603, thereby estimating and compensating the frequency offset with more accuracy. Moreover, the decoding result of the block decoder 604 may be fed-back to the equalizer 602, thereby enhancing the equalizing performance.

The equalizer 602 may perform channel equalization by using a plurality of methods. An example of estimating a channel impulse response (CIR) so as to perform channel equalization will be given in the description of the present invention. Most particularly, an example of estimating the CIR in accordance with each region within the data group, which is hierarchically divided and transmitted from the transmitting system, and applying each CIR differently will also be described herein. Furthermore, by using the known data, the place and contents of which is known in accordance with an agreement between the transmitting system and the receiving system, and the field synchronization data, so as to estimate the CIR, the present invention may be able to perform channel equalization with more stability.

Herein, the data group that is inputted for the equalization process is divided into regions A to C, as shown in FIG. 2. More specifically, in the example of the present invention, each region A, B, and C are further divided into regions A1 to A5, regions B1 and B2, and regions C1 to C3, respectively. Referring to FIG. 2, the CIR that is estimated from the field synchronization data in the data structure is referred to as CIR_FS. Alternatively, the CIRs that are estimated from each of the 5 known data sequences existing in region A are sequentially referred to as CIR_N0, CIR_N1, CIR_N2, CIR_N3, and CIR_N4.

As described above, the present invention uses the CIR estimated from the field synchronization data and the known data sequences in order to perform channel equalization on data within the data group. At this point, each of the estimated CIRs may be directly used in accordance with the characteristics of each region within the data group. Alternatively, a plurality of the estimated CIRs may also be either interpolated or extrapolated so as to create a new CIR, which is then used for the channel equalization process.

Herein, when a value F(Q) of a function F(x) at a particular point Q and a value F(S) of the function F(x) at another particular point S are known, interpolation refers to estimating a function value of a point within the section between points Q and S. Linear interpolation corresponds to the simplest form among a wide range of interpolation operations. The linear interpolation described herein is merely exemplary among a wide range of possible interpolation methods. And, therefore, the present invention is not limited only to the examples set forth herein.

Alternatively, when a value F(Q) of a function F(x) at a particular point Q and a value F(S) of the function F(x) at another particular point S are known, extrapolation refers to estimating a function value of a point outside of the section between points Q and S. Linear extrapolation is the simplest form among a wide range of extrapolation operations. Similarly, the linear extrapolation described herein is merely exemplary among a wide range of possible extrapolation methods. And, therefore, the present invention is not limited only to the examples set forth herein.

More specifically, in case of region C1, any one of the CIR_N4 estimated from a previous data group, the CIR_FS estimated from the current data group that is to be processed with channel equalization, and a new CIR generated by extrapolating the CIR_FS of the current data group and the CIR_N0 may be used to perform channel equalization. Alternatively, in case of region B1, a variety of methods may be applied as described in the case for region C1. For example, a new CIR created by linearly extrapolating the CIR_FS estimated from the current data group and the CIR_N0 may be used to perform channel equalization. Also, the CIR_FS estimated from the current data group may also be used to perform channel equalization. Finally, in case of region A1, a new CIR may be created by interpolating the CIR_FS estimated from the current data group and CIR_N0, which is then used to perform channel equalization. Furthermore, any one of the CIR_FS estimated from the current data group and CIR_N0 may be used to perform channel equalization.

In case of regions A2 to A5, CIR_N(i−1) estimated from the current data group and CIR_N(i) may be interpolated to create a new CIR and use the newly created CIR to perform channel equalization. Also, any one of the CIR_N(i−1) estimated from the current data group and the CIR_N(i) may be used to perform channel equalization. Alternatively, in case of regions B2, C2, and C3, CIR_N3 and CIR_N4 both estimated from the current data group may be extrapolated to create a new CIR, which is then used to perform the channel equalization process. Furthermore, the CIR_N4 estimated from the current data group may be used to perform the channel equalization process. Accordingly, an optimum performance may be obtained when performing channel equalization on the data inserted in the data group. The methods of obtaining the CIRs required for performing the channel equalization process in each region within the data group, as described above, are merely examples given to facilitate the understanding of the present invention. A wider range of methods may also be used herein. And, therefore, the present invention will not only be limited to the examples given in the description set forth herein.

Meanwhile, if the data being channel equalized and then inputted to the block decoder 604 correspond to the enhanced data on which additional encoding and trellis encoding are both performed by the transmitting system, trellis-decoding and additional decoding processes are performed as inverse processes of the transmitting system. Alternatively, if the data being channel equalized and then inputted to the block decoder 604 correspond to the main data on which additional encoding is not performed and only trellis-encoding is performed by the transmitting system, only the trellis-decoding process is performed.

The data group decoded by the block decoder 604 is inputted to the enhanced data deformatter 605, and the main data packet is inputted to the data deinterleaver 608.

More specifically, if the inputted data correspond to the main data, the block decoder 604 performs Viterbi decoding on the inputted data, so as to either output a hard decision value or hard-decide a soft decision value and output the hard-decided result. On the other hand, if the inputted correspond to the enhanced data, the block decoder 604 outputs either a hard decision value or a soft decision value on the inputted enhanced data. In other words, if the data inputted to the block decoder 604 correspond to the enhanced data, the block decoder 604 performs a decoding process on the data encoded by the block processor and the trellis encoder of the transmitting system. At this point, the output of the RS frame encoder included in the pre-processor of the transmitting system becomes an external code, and the output of the block processor and the trellis encoder becomes an internal code. In order to show maximum performance of the external code when decoding such connection codes, the decoder of the internal code should output a soft decision value. Therefore, the block decoder 604 may output a hard decision value on the enhanced data. However, when required, it is more preferable that the block decoder 604 outputs a soft decision value.

More specifically, depending upon the system design or conditions, the block decoder 604 outputs any one of the soft decision value and the hard decision value with respect to the enhanced data, and the block decoder 604 outputs the hard decision value with respect to the main data.

Meanwhile, the data deinterleaver 608, the RS decoder 609, and the data derandomizer 610 are blocks required for receiving the main data. Therefore, the above-mentioned blocks may not be required in the structure of a receiving system that is designed to receive only the enhanced data. The data deinterleaver 608 performs an inverse process of the data interleaver included in the transmitting system by deinterleaving the main data. Then, the data deinterleaver 608 outputs the deinterleaved data to the RS decoder 609. The RS decoder 609 performs a systematic RS decoding process on the deinterleaved data and outputs the processed data to the data derandomizer 610.

The data derandomizer 610 received the data outputted from the RS decoder 609 and generates a pseudo random data byte identical to that of the randomizer included in the digital broadcast transmitting system (or DTV transmitter). Thereafter, the data derandomizer 610 performs a bitwise exclusive OR (XOR) operation between the generated pseudo random data byte and the data packet outputted from the RS decoder 609, thereby inserting the MPEG synchronization bytes to the beginning of each packet so as to output the data in 188-byte main data packet units.

Meanwhile, the data being outputted from the block decoder 604 are inputted to the data deformatter 605 in an data group format. At this point, the data deformatter 605 already knows the configuration of the inputted data. Therefore, the data deformatter 605 is capable of identifying the signaling information, which includes system information, and the enhanced data within the A area. Herein, the data deformatter 605 removes the known data, trellis initialization data, and MPEG header that have been inserted in the main data and data group, and also removes the RS parity data that have been inserted by the RS encoder/non-systematic RS encoder or the non-systematic RS encoder of the transmitting system. Thereafter, the data deformatter 605 outputs the processed data to the RS frame decoder 606.

The RS frame decoder 606 performs an inverse process of the RS frame encoder included in the transmitting system on the output data of the data deformatter 605. Then, the RS frame decoder 606 outputs the processed data to the derandomizer 607. More specifically, the RS frame decoder 606 performs at least one of error detection decoding, inversed row permutation, and error correction decoding on the input data so as to recover the enhanced data to the initial (or original) enhanced data. The derandomizer 607 derandomizes the inputted enhanced data by performing an inverse process of the randomizer 111 included in the transmitting system. Meanwhile, the known data estimator 603 estimates the known data place inserted by the transmitting system and, at the same time, estimates the coarse frequency offset while estimating the known data. At this point, as shown in the first embodiment, the transmitting system may only initialize the memories m1 and m0 of the trellis encoder at the initialization data place holder (or the starting point of the known data sequence). Alternatively, as shown in the second embodiment, the transmitting system may initialize all three memories m2, m1, and m0 of the trellis encoder.

Particularly, as shown in the first embodiment, when initializing only the memories m1 and m0 of the trellis encoder (i.e., when the memory m2 within the pre-coder is not initialized), and when the known data are trellis-encoded and outputted, two different known data sequences may be outputted based upon the initial state of the memory m2 within the pre-coder. Therefore, the known data estimator 603 of the digital broadcast receiving system (or digital television receiver) may estimate the status (or state) of the pre-coder so as to detect the known data.

Figure 10:
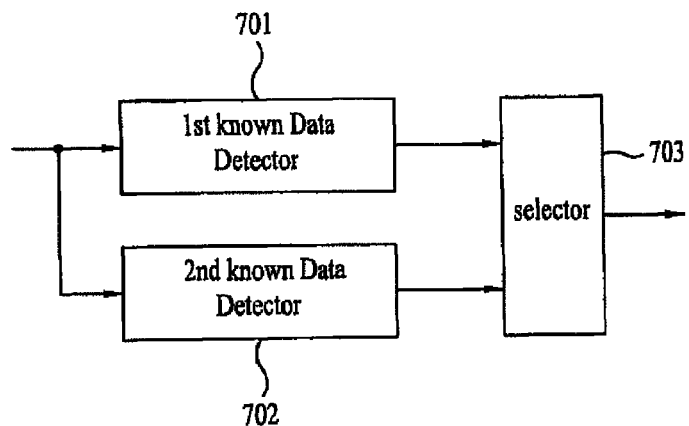
FIG. 10 illustrates a block diagram showing a known data estimator of FIG. 9.

In order to do so, the known data estimator 603 as shown in FIG. 10 includes a first known data detector 701, a second known data detector 702, and a selector 703.

The first known data detector 701 detects a known data symbol sequence that is generated when the initial state of the memory m2 within the pre-coder of the trellis encoder included in the transmitting system is '0'. The second known data detector 702 detects a known data symbol sequence that is generated when the initial state of the memory m2 is '1'. For this, the first known data detector 701 calculates a partial correlation between the received signal and a first reference known data sequence, thereby detecting the place of the corresponding known data and estimating the coarse frequency offset, which are then outputted. Additionally, the second known data detector 702 calculates a partial correlation between the received signal and a second reference known data sequence, thereby detecting the place of the corresponding known data and estimating the coarse frequency offset, which are then outputted. Herein, the first reference known data sequence corresponds to a reference data sequence that is generated from or stored in the receiving system, when it is assumed that the initial state of the pre-coder memory m2 within the trellis encoder included in the transmitting system is '0'. The second reference known data sequence corresponds to a reference data sequence that is generated from or stored in the receiving system, when it is assumed that the initial state of the pre-coder memory m2 within the trellis encoder included in the transmitting system is '1'.

The selector 703 compares each peak value of the partial correlation values respectively outputted from the first known data detector 701 and the second known data detector 702. Thereafter, the selector 703 selects the known data detector having the higher (or greater) peak value. The, the selector 703 outputs the known data place information, frequency offset, and selected information (e.g., estimated initial state value of the pre-coder memory), which are outputted from the selected known data detector. Since the components and operation of the first known data detector 701 and the second known data detector 702 are identical to one another, the description of only one known data detector according to the present invention will be provided herein.

Figure 11:
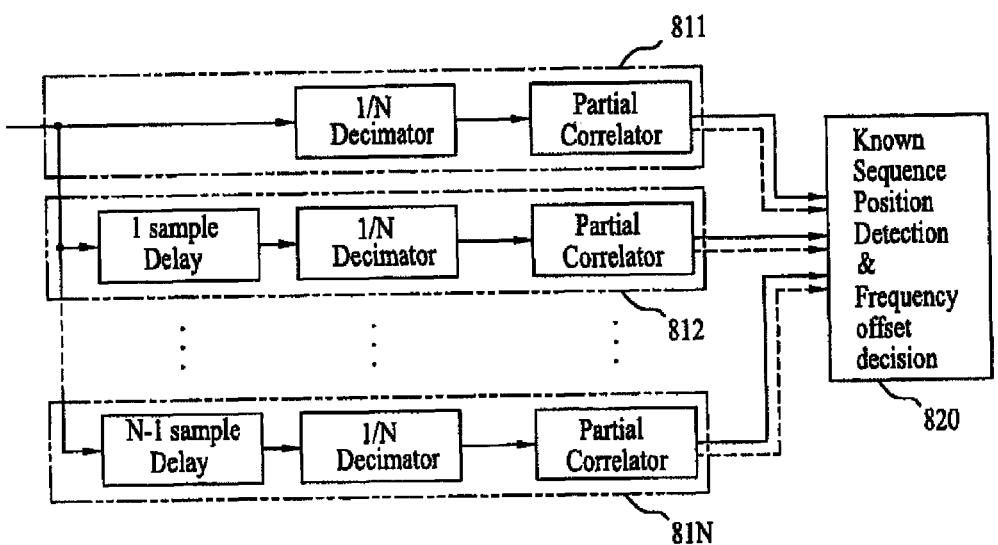
FIG. 11 illustrates a block diagram showing a known data detector of FIG. 10.

FIG. 11 illustrates a block diagram shown the structure of a known data detector. More specifically, FIG. 11 illustrates an example an inputted signal being oversampled to N times its initial state. Herein, N represents a sampling rate of the received signal. Referring to FIG. 11, the known sequence detector includes N number of partial correlators 811 to 81N configured in parallel, and a known data place detector and frequency offset decider 820. Herein, the first partial correlator 811 consists of a 1/N decimator, and a partial correlator. The second partial correlator 812 consists of a 1 sample delay, a 1/N decimator, and a partial correlator. And, the $N^{th}$ partial correlator 81N consists of a N−1 sample delay, a 1/N decimator, and a partial correlator. These are used to match (or identify) the phase of each of the samples within the oversampled symbol with the phase of the original symbol, and to decimate the samples of the remaining phases, thereby performing partial correlation on each sample. More specifically, the input signal is decimated at a rate of 1/N for each sampling phase, so as to pass through each partial correlator.

For example, when the input signal is oversampled to 2 times (i.e., when N=2), this indicates that two samples are included in one signal. In this case, two partial correlators are required, and each 1/N decimator becomes a 1/2 decimator. At this point, the 1/N decimator of the first partial correlator 811 decimates (or removes), among the input samples, the samples located in-between symbol places (or positions). Then, the corresponding 1/N decimator outputs the decimated sample to the partial correlator. Furthermore, the 1 sample delay of the second partial correlator 812 delays the input sample by 1 sample (i.e., performs a 1 sample delay on the input sample) and outputs the delayed input sample to the 1/N decimator. Subsequently, among the samples inputted from the 1 sample delay, the 1/N decimator of the second partial correlator 812 decimates (or removes) the samples located in-between symbol places (or positions). Thereafter, the corresponding 1/N decimator outputs the decimated sample to the partial correlator.

After each predetermined period of the symbol, each of the partial correlators outputs a correlation value and an estimation value of the frequency offset estimated at that particular moment to the known data place detector and frequency offset decider 820. The known data place detector and frequency offset decider 820 stores the output of the partial correlators corresponding to each sampling phase during an data group cycle or a pre-decided cycle. Thereafter, the known data place detector and frequency offset decider 820 decides a position (or place) corresponding to the highest correlation value, among the stored values, as the place (or position) for receiving the known data. Simultaneously, the known data place detector and frequency offset decider 820 finally decides the estimation value of the frequency offset estimated at the moment corresponding to the highest correlation value as the coarse frequency offset value of the receiving system.

Figure 12:
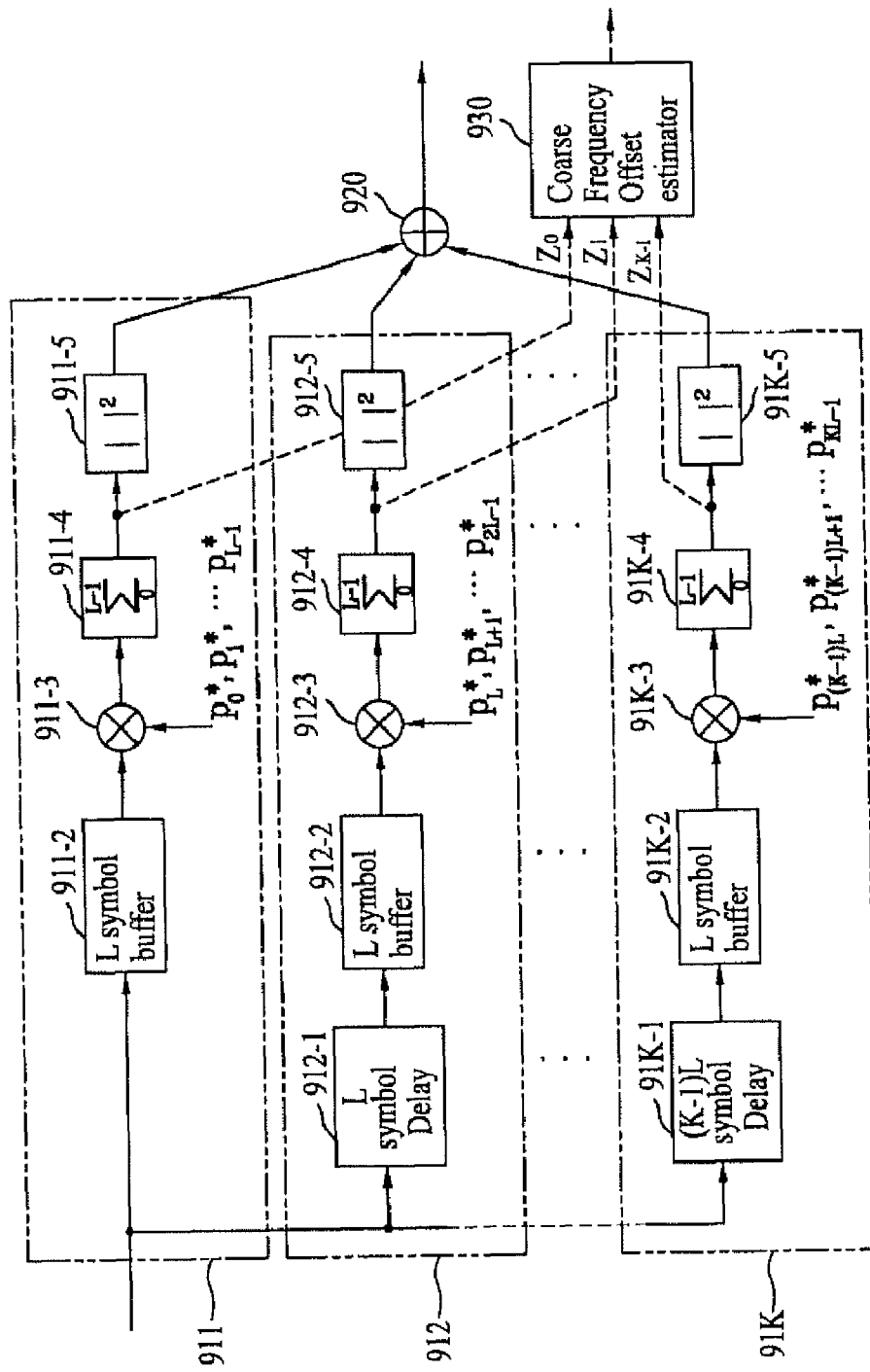
FIG. 12 illustrates a block diagram showing a partial correlator of FIG. 11.

FIG. 12 illustrates a block diagram showing the structure of one of the partial correlators shown in FIG. 11. During the step of detecting known data, since a frequency offset is included in the received signal, each partial correlator divides the known data, which is known according to an agreement between the transmitting system and the receiving system, to K number of parts each having an L symbol length, thereby correlating each divided part with the corresponding part of the received signal. In order to do so, each partial correlator includes K number of phase and size detector 911 to 91K each formed in parallel, an adder 920, and a coarse frequency offset estimator 930.

The first phase and size detector 911 includes an L symbol buffer 911-2, a multiplier 911-3, an accumulator 911-4, and a squarer 911-5. Herein, the first phase and size detector 911 calculates the correlation value of the known data having a first L symbol length among the K number of sections. Also, the second phase and size detector 912 includes an L symbol delay 912-1, an L symbol buffer 912-2, a multiplier 912-3, an accumulator 912-4, and a squarer 912-5. Herein, the second phase and size detector 912 calculates the correlation value of the known data having a second L symbol length among the K number of sections. Finally, the $N^{th}$ phase and size detector 91K includes a (K-1)L symbol delay 91K-1, an L symbol buffer 91K-2, a multiplier 91K-3, an accumulator 91K-4, and a squarer 91K-5. Herein, the $N^{th}$ phase and size detector 91K calculates the correlation value of the known data having an $N^{th}$ L symbol length among the K number of sections.

Referring to FIG. 12, $\{P_0, P_1, \ldots, P_{KL-1}\}$ each being multiplied with the received signal in the multiplier represents the reference known data sequence known by both the transmitting system and the receiving system. And, * represents a complex conjugate. For example, in the first phase and size detector 911, the signal outputted from the 1/N decimator of the first partial correlator 811, shown in FIG. 11, is temporarily stored in the L symbol buffer 911-2 of the first phase and size detector 911 and then inputted to the multiplier 911-3. The multiplier 911-3 multiplies the output of the L symbol buffer 911-2 with the complex conjugate of the known data parts $P_0, P_1, \ldots P_{KL-1}$, each having a first L symbol length among the known K number of sections. Then, the multiplied result is outputted to the accumulator 911-4. During the L symbol period, the accumulator 911-4 accumulates the output of the multiplier 911-3 and, then, outputs the accumulated value to the squarer 911-5 and the coarse frequency offset estimator 930. The output of the accumulator 911-4 is a correlation value having a phase and a size. Accordingly, the squarer 911-5 calculates an absolute value of the output of the multiplier 911-4 and squares the calculated absolute value, thereby obtaining the size of the correlation value. The obtained size is then inputted to the adder 920.

The adder 920 adds the output of the squarers corresponding to each size and phase detector 911 to 91K. Then, the adder 920 outputs the added result to the known data place detector and frequency offset decider 820. Also, the coarse frequency offset estimator 930 receives the output of the accumulator corresponding to each size and phase detector 911 to 91K, so as to estimate the coarse frequency offset at each corresponding sampling phase. Thereafter, the coarse frequency offset estimator 930 outputs the estimated offset value to the known data place detector and frequency offset decider 820. When the K number of inputs that are outputted from the accumulator of each phase and size detector 911 to 91K are each referred to as $\{Z_0, Z_1, \ldots, Z_{K-1}\}$, the output of the coarse frequency offset estimator 930 may be obtained by using Equation 1 shown below.

$$\omega_0 = \frac{1}{L}\arg\left\{\sum_{n=1}^{K-1}\left(\frac{Z_n}{|Z_n|}\right)\left(\frac{Z_{n-1}}{|Z_{n-1}|}\right)^*\right\}$$ Equation 1

The known data place detector and frequency offset decider 820 stores the output of the partial correlator corresponding to each sampling phase during an data group cycle or a pre-decided cycle. Then, among the stored correlation values, the known data place detector and frequency offset decider 820 decides the place (or position) corresponding to the highest correlation value as the place for receiving the known data. Furthermore, the known data place detector and frequency offset decider 820 decides the estimated value of the frequency offset taken (or estimated) at the point of the highest correlation value as the coarse frequency offset value of the receiving system. For example, if the output of the partial correlator corresponding to the second partial correlator 812 is the highest value, the place corresponding to the highest value is decided as the known data place. Thereafter, the coarse frequency offset estimated by the second partial correlator 812 is decided as the final coarse frequency offset, which is then outputted to the selector 703.

Figure 13:
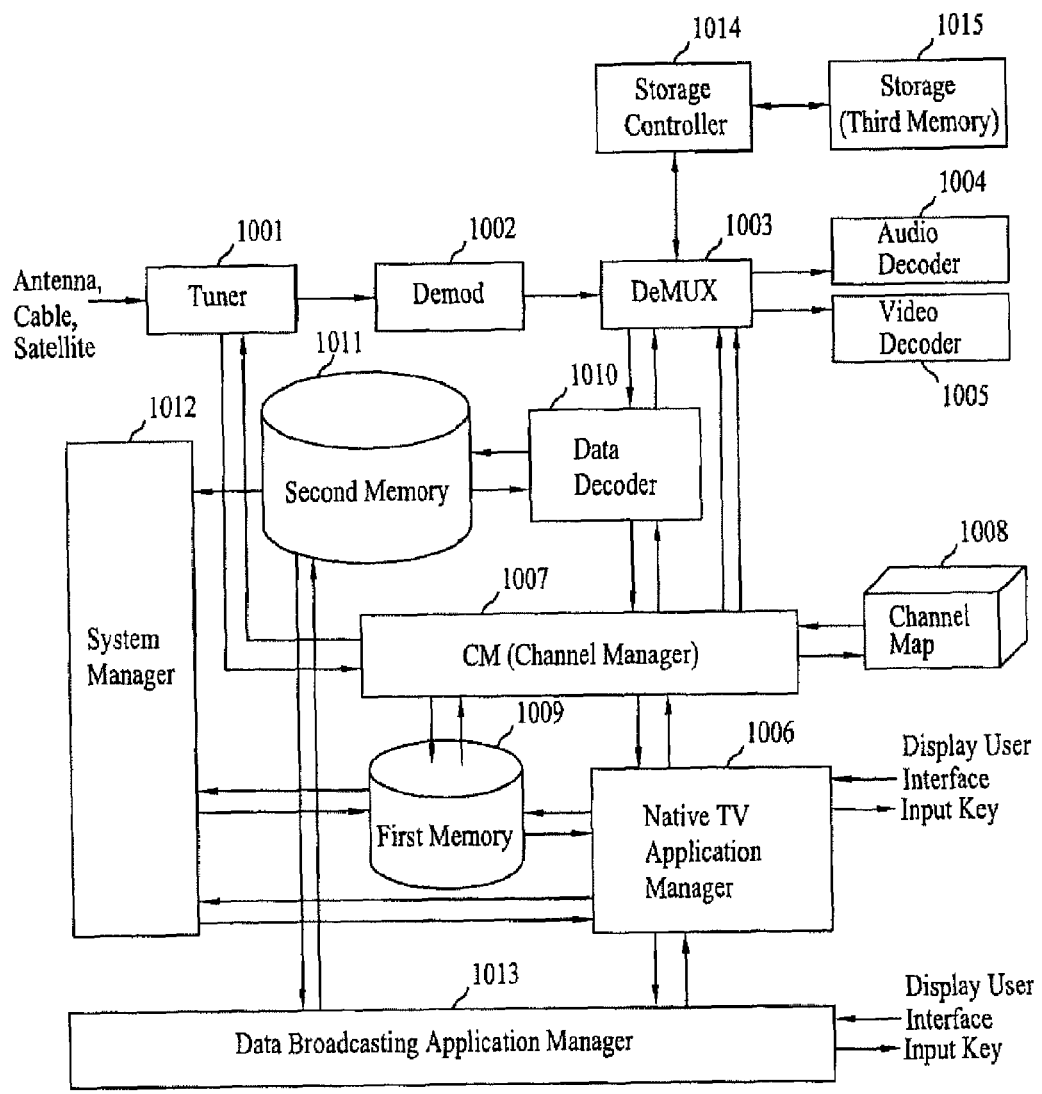
FIG. 13 illustrates a block diagram of a digital broadcast receiving system according to an embodiment of the present invention.

FIG. 13 illustrates a block diagram showing the structure of a digital broadcast receiving system according to an embodiment of the present invention. Referring to FIG. 13, the digital broadcast receiving system includes a tuner 1001, a demodulating unit 1002, a demultiplexer 1003, an audio decoder 1004, a video decoder 1005, a native TV application manager 1006, a channel manager 1007, a channel map 1008, a first memory 1009, a data decoder 1010, a second memory 1011, a system manager 1012, a data broadcasting application manager 1013, a storage controller 1014, and a third memory 1015. Herein, the third memory 1015 is a mass storage device, such as a hard disk drive (HDD) or a memory chip. The tuner 1001 tunes a frequency of a specific channel through any one of an antenna, cable, and satellite. Then, the tuner 1001 downconverts the tuned frequency to an intermediate frequency (IF), which is then outputted to the demodulating unit 1002. At this point, the tuner 1001 is controlled by the channel manager 1007. Additionally, the result and strength of the broadcast signal of the tuned channel are also reported to the channel manager 1007. The data that are being received by the frequency of the tuned specific channel include main data, enhanced data, and table data for decoding the main data and enhanced data.

In the embodiment of the present invention, examples of the enhanced data may include data provided for data service, such as Java application data, HTML application data, XML data, and so on. The data provided for such data services may correspond either to a Java class file for the Java application, or to a directory file designating positions (or locations) of such files. Furthermore, such data may also correspond to an audio file and/or a video file used in each application. The data services may include weather forecast services, traffic information services, stock information services, services providing information quiz programs providing audience participation services, real time poll, user interactive education programs, gaming services, services providing information on soap opera (or TV series) synopsis, characters, original sound track, filing sites, services providing information on past sports matches, profiles and accomplishments of sports players, product information and product ordering services, services providing information on broadcast programs by media type, airing time, subject, and so on. The types of data services described above are only exemplary and are not limited only to the examples given herein. Furthermore, depending upon the embodiment of the present invention, the enhanced data may correspond to meta data. For example, the meta data use the XML application so as to be transmitted through a DSM-CC protocol.

The demodulating unit 1002 performs VSB-demodulation and channel equalization on the signal being outputted from the tuner 1001, thereby identifying the main data and the enhanced data. Thereafter, the identified main data and enhanced data are outputted in TS packet units. Example of the demodulating unit 1002 is shown in FIG. 9. The demodulating unit shown in FIG. 9 is merely exemplary and the scope of the present invention is not limited to the examples set forth herein. In the embodiment given as an example of the present invention, only the enhanced data packet outputted from the demodulating unit 1002 is inputted to the demultiplexer 1003. In this case, the main data packet is inputted to another demultiplexer (not shown) that processes main data packets. Herein, the storage controller 1014 is also connected to the other demultiplexer in order to store the main data after processing the main data packets. The demultiplexer of the present invention may also be designed to process both enhanced data packets and main data packets in a single demultiplexer.

The storage controller 1014 is interfaced with the demultipelxer so as to control instant recording, reserved (or pre-programmed) recording, time shift, and so on of the enhanced data and/or main data. For example, when one of instant recording, reserved (or pre-programmed) recording, and time shift is set and programmed in the receiving system (or receiver) shown in FIG. 13, the corresponding enhanced data and/or main data that are inputted to the demultiplexer are stored in the third memory 1015 in accordance with the control of the storage controller 1014. The third memory 1015 may be described as a temporary storage area and/or a permanent storage area. Herein, the temporary storage area is used for the time shifting function, and the permanent storage area is used for a permanent storage of data according to the user's choice (or decision).

When the data stored in the third memory 1015 need to be reproduced (or played), the storage controller 1014 reads the corresponding data stored in the third memory 1015 and outputs the read data to the corresponding demultiplexer (e.g., the enhanced data are outputted to the demultiplexer 1003 shown in FIG. 13). At this point, according to the embodiment of the present invention, since the storage capacity of the third memory 1015 is limited, the compression encoded enhanced data and/or main data that are being inputted are directly stored in the third memory 1015 without any modification for the efficiency of the storage capacity. In this case, depending upon the reproduction (or reading) command, the data read from the third memory 1015 pass trough the demultiplexer so as to be inputted to the corresponding decoder, thereby being restored to the initial state.

The storage controller 1014 may control the reproduction (or play), fast-forward, rewind, slow motion, instant replay functions of the data that are already stored in the third memory 1015 or presently being buffered. Herein, the instant replay function corresponds to repeatedly viewing scenes that the viewer (or user) wishes to view once again. The instant replay function may be performed on stored data and also on data that are currently being received in real time by associating the instant replay function with the time shift function. If the data being inputted correspond to the analog format, for example, if the transmission mode is NTSC, PAL, and so on, the storage controller 1014 compression encodes the inputted data and stored the compression-encoded data to the third memory 1015. In order to do so, the storage controller 1014 may include an encoder, wherein the encoder may be embodied as one of software, middleware, and hardware. Herein, an MPEG encoder may be used as the encoder according to an embodiment of the present invention. The encoder may also be provided outside of the storage controller 1014.

Meanwhile, in order to prevent illegal duplication (or copies) of the input data being stored in the third memory 1015, the storage controller 1014 scrambles the input data and stores the scrambled data in the third memory 1015. Accordingly, the storage controller 1014 may include a scramble algorithm for scrambling the data stored in the third memory 1015 and a descramble algorithm for descrambling the data read from the third memory 1015. Herein, the definition of scramble includes encryption, and the definition of descramble includes decryption. The scramble method may include using an arbitrary key (e.g., control word) to modify a desired set of data, and also a method of mixing signals.

Meanwhile, the demultiplexer 1003 receives the real-time data outputted from the demodulating unit 1002 or the data read from the third memory 1015 and demultiplexes the received data. In the example given in the present invention, the demultiplexer 1003 performs demultiplexing on the enhanced data packet. Therefore, in the present invention, the receiving and processing of the enhanced data will be described in detail. It should also be noted that a detailed description of the processing of the main data will be omitted for simplicity starting from the description of the demultiplexer 1003 and the subsequent elements.

The demultiplexer 1003 demultiplexes enhanced data and program specific information/program and system information protocol (PSI/PSIP) tables from the enhanced data packet inputted in accordance with the control of the data decoder 1010. Thereafter, the demultiplexed enhanced data and PSI/PSIP tables are outputted to the data decoder 1010 in a section format. In order to extract the enhanced data from the channel through which enhanced data are transmitted and to decode the extracted enhanced data, system information is required. Such system information may also be referred to as service information. The system information may include channel information, event information, etc. In the embodiment of the present invention, the PSI/PSIP tables are applied as the system information. However, the present invention is not limited to the example set forth herein. More specifically, regardless of the name, any protocol transmitting system information in a table format may be applied in the present invention.

The PSI table is an MPEG-2 system standard defined for identifying the channels and the programs. The PSIP table is an advanced television systems committee (ATSC) standard that can identify the channels and the programs. The PSI table may include a program association table (PAT), a conditional access table (CAT), a program map table (PMT), and a network information table (NIT). Herein, the PAT corresponds to special information that is transmitted by a data packet having a PID of '0'. The PAT transmits PID information of the PMT and PID information of the NIT corresponding to each program. The CAT transmits information on a paid broadcast system used by the transmitting system. The PMT transmits PID information of a transport stream (TS) packet, in which program identification numbers and individual bit sequences of video and audio data configuring the corresponding program are transmitted, and the PID information, in which PCR is transmitted. The NIT transmits information of the actual transmission network.

The PSIP table may include a virtual channel table (VCT), a system time table (STT), a rating region table (RRT), an extended text table (ETT), a direct channel change table (DCCT), an event information table (EIT), and a master guide table (MGT). The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and the channel number. The STT transmits information on the current data and timing information. The RRT transmits information on region and consultation organs for program ratings. The ETT transmits additional description of a specific channel and broadcast program. The EIT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

Each of the above-described tables included in the PSI/PSIP is configured of a basic unit referred to as a "section", and a combination of one or more sections forms a table. For example, the VCT may be divided into 256 sections. Herein, one section may include a plurality of virtual channel information. However, a single set of virtual channel information is not divided into two or more sections. At this point, the receiving system may parse and decode the data for the data service that are transmitting by using only the tables included in the PSI, or only the tables included in the PSIP, or a combination of tables included in both the PSI and the PSIP. In order to parse and decode the data for the data service, at least one of the PAT and PMT included in the PSI, and the VCT included in the PSIP is required. For example, the PAT may include the system information for transmitting the data corresponding to the data service, and the PID of the PMT corresponding to the data service data (or program number). The PMT may include the PID of the TS packet used for transmitting the data service data. The VCT may include information on the virtual channel for transmitting the data service data, and the PID of the TS packet for transmitting the data service data.

Meanwhile, depending upon the embodiment of the present invention, a DVB-SI may be applied instead of the PSIP. The DVB-SI may include a network information table (NIT), a service description table (SDT), an event information table (ETT), and a time and data table (TDT). The DVB-SI may be used in combination with the above-described PSI. Herein, the NIT divides the services corresponding to particular network providers by specific groups. The NIT includes all tuning information that is used during the IRD set-up. The NIT may be used for informing or notifying any change in the tuning information. The SDT includes the service name and different parameters associated with each service corresponding to a particular MPEG multiplex. The EIT is used for transmitting information associated with all events occurring in the MPEG multiplex. The EIT includes information on the current transmission and also includes information selectively containing different transmission streams that may be received by the IRD. And, the TDT is used for updating the clock included in the IRD.

Furthermore, three selective SI tables (i.e., a bouquet associate table (BAT), a running status table (RST), and a stuffing table (ST)) may also be included. More specifically, the bouquet associate table (BAT) provides a service grouping method enabling the IRD to provide services to the viewers. Each specific service may belong to at least one 'bouquet' unit. A running status table (RST) section is used for promptly and instantly updating at least one event execution status. The execution status section is transmitted only once at the changing point of the event status. Other SI tables are generally transmitted several times. The stuffing table (ST) may be used for replacing or discarding a subsidiary table or the entire SI tables.

In the present invention, the enhanced data included in the payload within the TS packet consist of a digital storage media-command and control (DSM-CC) section format. However, the TS packet including the data service data may correspond either to a packetized elementary stream (PES) type or to a section type. More specifically, either the PES type data service data configure the TS packet, or the section type data service data configure the TS packet. The TS packet configured of the section type data will be given as the example of the present invention. At this point, the data service data are includes in the digital storage media-command and control (DSM-CC) section. Herein, the DSM-CC section is then configured of a 188-byte unit TS packet.

Furthermore, the packet identification of the TS packet configuring the DSM-CC section is included in a data service table (DST). When transmitting the DST, '0x95' is assigned as the value of a stream type field included in the service location descriptor of the PMT or the VCT. More specifically, when the PMT or VCT stream_type field value is '0x95', the receiving system may acknowledge that data broadcasting including enhanced data (i.e., the enhanced data) is being received. At this point, the enhanced data may be transmitted by a data carousel method. The data carousel method corresponds to repeatedly transmitting identical data on a regular basis.

At this point, according to the control of the data decoder 1010, the demultiplexer 1003 performs section filtering, thereby discarding repetitive sections and outputting only the non-repetitive sections to the data decoder 1010. The demultiplexer 1003 may also output only the sections configuring desired tables (e.g., VCT) to the data decoder 1010 by section filtering. Herein, the VCT may include a specific descriptor for the enhanced data. However, the present invention does not exclude the possibilities of the enhanced data being included in other tables, such as the PMT. The section filtering method may include a method of verifying the PID of a table defined by the MGT, such as the VCT, prior to performing the section filtering process. Alternatively, the section filtering method may also include a method of directly performing the section filtering process without verifying the MGT, when the VCT includes a fixed PID (i.e., a base PID). At this point, the demultiplexer 1003 performs the section filtering process by referring to a table_id field, a version-_number field, a section_number field, etc.

As described above, the method of defining the PID of the VCT broadly includes two different methods. Herein, the PID of the VCT is a packet identifier required for identifying the VCT from other tables. The first method consists of setting the PID of the VCT so that it is dependent to the MGT. In this case, the receiving system cannot directly verify the VCT among the many PSI and/or PSIP tables. Instead, the receiving system must check the PID defined in the MGT in order to read the VCT. Herein, the MGT defines the PID, size, version number, and so on, of diverse tables. The second method consists of setting the PID of the VCT so that the PID is given a base PID value (or a fixed PID value), thereby being independent from the MGT. In this case, unlike in the first method, the VCT according to the present invention may be identified without having to verify every single PID included in the MGT. Evidently, an agreement on the base PID must be previously made between the transmitting system and the receiving system.

Meanwhile, in the embodiment of the present invention, the demultiplexer 1003 may output only an application information table (AIT) to the data decoder 1010 by section filtering. The AIT includes information on an application being operated in the receiving system for the data service. The AIT may also be referred to as an XAIT, and an AMT. Therefore, any table including application information may correspond to the following description. When the AIT is transmitted, a value of '0x05' may be assigned to a stream_type field of the PMT. The AIT may include application information, such as application name, application version, application priority, application ID, application status (i.e., auto-start, user-specific settings, kill, etc.), application type (i.e., Java or HTML), position (or location) of stream including application class and data files, application platform directory, and location of application icon.

In the method for detecting application information for the data service by using the AIT, component_tag, original_network_id, transport_stream_id, and service_id fields may be used for detecting the application information. The component_tag field designates an elementary stream carrying a DSI of a corresponding object carousel. The original_network_id field indicates a DVB-SI original_network_id of the TS providing transport connection. The transport_stream_id field indicates the MPEG TS of the TS providing transport connection, and the service_id field indicates the DVB-SI of the service providing transport connection. Information on a specific channel may be obtained by using the original_network_id field, the transport_stream_id field, and the service_id field. The data service data, such as the application data, detected by using the above-described method may be stored in the second memory 1011 by the data decoder 1010.

The data decoder 1010 parses the DSM-CC section configuring the demultiplexed enhanced data. Then, the enhanced data corresponding to the parsed result are stored as a database in the second memory 1011. The data decoder 1010 groups a plurality of sections having the same table identification (table_id) so as to configure a table, which is then parsed. Thereafter, the parsed result is stored as a database in the second memory 1011. At this point, by parsing data and/or sections, the data decoder 1010 reads all of the remaining actual section data that are not section-filtered by the demultiplexer 1003. Then, the data decoder 1010 stores the read data to the second memory 1011. The second memory 1011 corresponds to a table and data carousel database storing system information parsed from tables and enhanced data parsed from the DSM-CC section. Herein, a table id field, a section_number field, and a last_section-_number field included in the table may be used to indicate whether the corresponding table is configured of a single section or a plurality of sections. For example, TS packets having the PID of the VCT are grouped to form a section, and sections having table identifiers allocated to the VCT are grouped to form the VCT, When the VCT is parsed, information on the virtual channel to which enhanced data are transmitted may be obtained. The obtained application identification information, service component identification information, and service information corresponding to the data service may either be stored in the second memory 1011 or be outputted to the data broadcasting application manager 1013. In addition, reference may be made to the application identification information, service component identification information, and service information in order to decode the data service data. Alternatively, such information may also prepare the operation of the application program for the data service. Furthermore, the data decoder 1010 controls the demultiplexing of the system information table, which corresponds to the information table associated with the channel and events. Thereafter, an A.V PID list may be transmitted to the channel manager 1007.

The channel manager 1007 may refer to the channel map 1008 in order to transmit a request for receiving system-related information data to the data decoder 1010, thereby receiving the corresponding result. In addition, the channel manager 1007 may also control the channel tuning of the tuner 1001. Furthermore, the channel manager 1007 may directly control the demultiplexer 1003, so as to set up the A/V PID, thereby controlling the audio decoder 1004 and the video decoder 1005. The audio decoder 1004 and the video decoder 1005 may respectively decode and output the audio data and video data demultiplexed from the main data packet. Alternatively, the audio decoder 1004 and the video decoder 1005 may respectively decode and output the audio data and video data demultiplexed from the enhanced data packet. Meanwhile, when the enhanced data include data service data, and also audio data and video data, it is apparent that the audio data and video data demultiplexed by the demultiplexer 1003 are respectively decoded by the audio decoder 1004 and the video decoder 1005. For example, an audio-coding (AC)-3 decoding algorithm may be applied to the audio decoder 1004, and a MPEG-2 decoding algorithm may be applied to the video decoder 1005.

Meanwhile, the native TV application manager 1006 operates a native application program stored in the first memory 1009, thereby performing general functions such as channel change. The native application program refers to software stored in the receiving system upon shipping of the product. More specifically, when a user request (or command) is transmitted to the receiving system through a user interface (UI), the native TV application manger 1006 displays the user request on a screen through a graphic user interface (GUI), thereby responding to the user's request. The user interface receives the user request through an input device, such as a remote controller, a key pad, a jog controller, an a touch-screen provided on the screen, and then outputs the received user request to the native TV application manager 1006 and the data broadcasting application manager 1013. Furthermore, the native TV application manager 1006 controls the channel manager 1007, thereby controlling channel-associated, such as the management of the channel map 1008, and controlling the data decoder 1010. The native TV application manager 1006 also controls the GUI of the overall receiving system, thereby storing the user request and status of the receiving system in the first memory 1009 and restoring the stored information.

The channel manager 1007 controls the tuner 1001 and the data decoder 1010, so as to managing the channel map 1008 so that it can respond to the channel request made by the user. More specifically, channel manager 1007 sends a request to the data decoder 1010 so that the tables associated with the channels that are to be tuned are parsed. The results of the parsed tables are reported to the channel manager 1007 by the data decoder 1010. Thereafter, based on the parsed results, the channel manager 1007 updates the channel map 1008 and sets up a PID in the demultiplexer 1003 for demultiplexing the tables associated with the data service data from the enhanced data.

The system manager 1012 controls the booting of the receiving system by turning the power on or off. Then, the system manager 1012 stores ROM images (including downloaded software images) in the first memory 1009. More specifically, the first memory 1009 stores management programs such as operating system (OS) programs required for managing the receiving system and also application program executing data service functions. The application program is a program processing the data service data stored in the second memory 1011 so as to provide the user with the data service. If the data service data are stored in the second memory 1011, the corresponding data service data are processed by the above-described application program or by other application programs, thereby being provided to the user. The management program and application program stored in the first memory 1009 may be updated or corrected to a newly downloaded program. Furthermore, the storage of the stored management program and application program is maintained without being deleted even if the power of the system is shut down. Therefore, when the power is supplied the programs may be executed without having to be newly downloaded once again.

The application program for providing data service according to the present invention may either be initially stored in the first memory 1009 upon the shipping of the receiving system, or be stored in the first 1009 after being downloaded. The application program for the data service (i.e., the data service providing application program) stored in the first memory 1009 may also be deleted, updated, and corrected. Furthermore, the data service providing application program may be downloaded and executed along with the data service data each time the data service data are being received.

When a data service request is transmitted through the user interface, the data broadcasting application manager 1013 operates the corresponding application program stored in the first memory 1009 so as to process the requested data, thereby providing the user with the requested data service. And, in order to provide such data service, the data broadcasting application manager 1013 supports the graphic user interface (GUI). Herein, the data service may be provided in the form of text (or short message service (SMS)), voice message, still image, and moving image. The data broadcasting application manager 1013 may be provided with a platform for executing the application program stored in the first memory 1009. The platform may be, for example, a Java virtual machine for executing the Java program. Hereinafter, an example of the data broadcasting application manager 1013 executing the data service providing application program stored in the first memory 1009, so as to process the data service data stored in the second memory 1011, thereby providing the user with the corresponding data service will now be described in detail.

Assuming that the data service corresponds to a traffic information service, the data service according to the present invention is provided to the user of a receiving system that is not equipped with an electronic map and/or a GPS system in the form of at least one of a text (or short message service (SMS)), a voice message, a graphic message, a still image, and a moving image. In this case, is a GPS module is mounted on the receiving system shown in FIG. 13, the GPS module receives satellite signals transmitted from a plurality of low earth orbit satellites and extracts the current position (or location) information (e.g., longitude, latitude, altitude), thereby outputting the extracted information to the data broadcasting application manager 1013.

At this point, it is assumed that the electronic map including information on each link and nod and other diverse graphic information are stored in one of the second memory 1011, the first memory 1009, and another memory that is not shown. More specifically, according to the request made by the data broadcasting application manager 1013, the data service data stored in the second memory 1011 are read and inputted to the data broadcasting application manager 1013. The data broadcasting application manager 1013 translates (or deciphers) the data service data read from the second memory 1011, thereby extracting the necessary information according to the contents of the message and/or a control signal.

Figure 14:
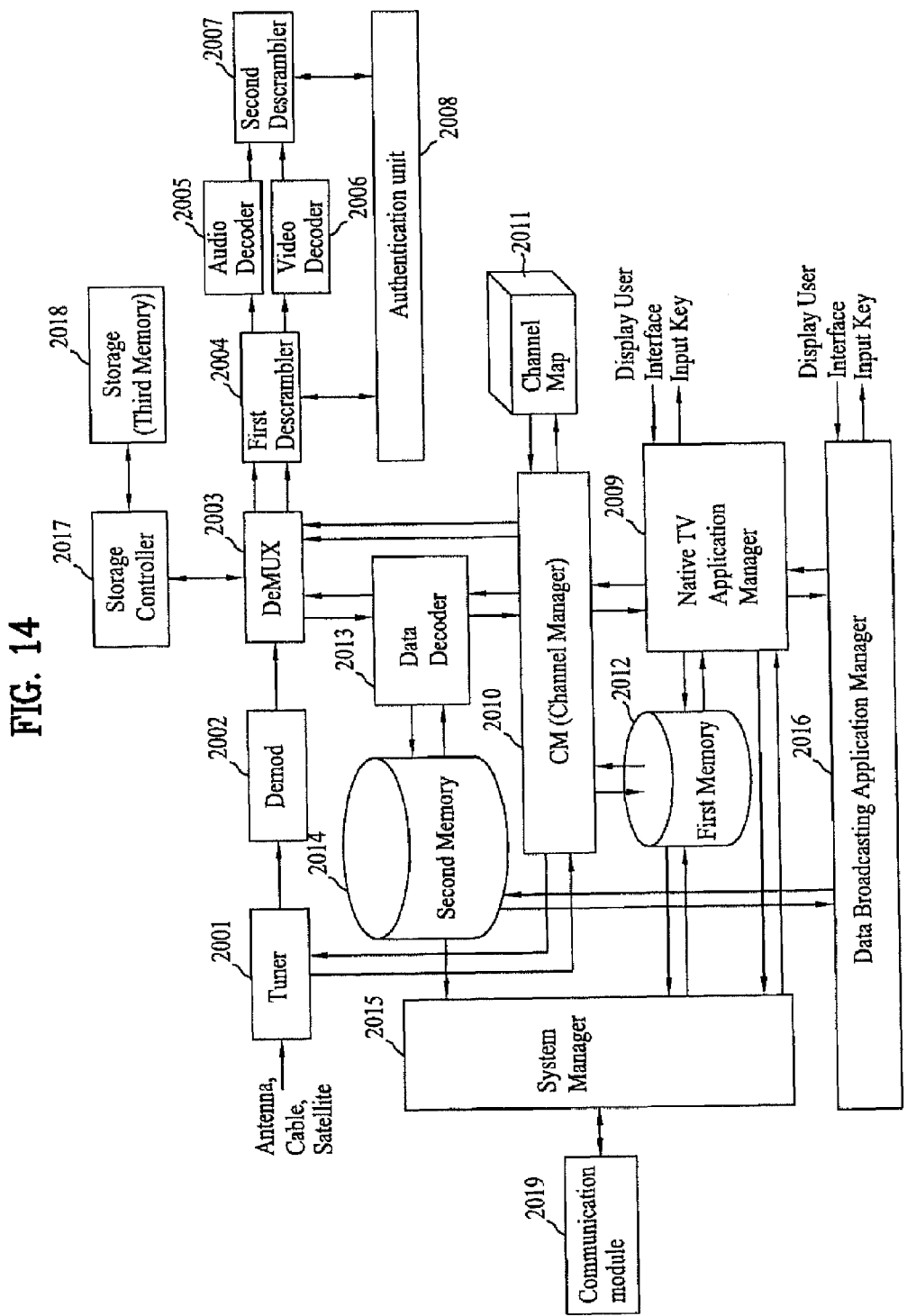
FIG. 14 illustrates a block diagram of a digital broadcast receiving system according to another embodiment of the present invention.

FIG. 14 illustrates a block diagram showing the structure of a digital broadcast (or television) receiving system according to another embodiment of the present invention. Referring to FIG. 14, the digital broadcast receiving system includes a tuner 2001, a demodulating unit 2002, a demultiplexer 2003, a first descrambler 2004, an audio decoder 2005, a video decoder 2006, a second descrambler 2007, an authentication unit 2008, a native TV application manager 2009, a channel manager 2010, a channel map 2011, a first memory 2012, a data decoder 2013, a second memory 2014, a system manager 2015, a data broadcasting application manager 2016, a storage controller 2017, a third memory 2018, and a telecommunication module 2019. Herein, the third memory 2018 is a mass storage device, such as a hard disk drive (HDD) or a memory chip. Also, during the description of the digital broadcast (or television or DTV) receiving system shown in FIG. 14, the components that are identical to those of the digital broadcast receiving system of FIG. 13 will be omitted for simplicity.

As described above, in order to provide services for preventing illegal duplication (or copies) or illegal viewing of the enhanced data and/or main data that are transmitted by using a broadcast network, and to provide paid broadcast services, the transmitting system may generally scramble and transmit the broadcast contents. Therefore, the receiving system needs to descramble the scrambled broadcast contents in order to provide the user with the proper broadcast contents. Furthermore, the receiving system may generally be processed with an authentication process with an authentication means before the descrambling process. Hereinafter, the receiving system including an authentication means and a descrambling means according to an embodiment of the present invention will now be described in detail.

According to the present invention, the receiving system may be provided with a descrambling means receiving scrambled broadcasting contents and an authentication means authenticating (or verifying) whether the receiving system is entitled to receive the descrambled contents. Hereinafter, the descrambling means will be referred to as first and second descramblers 2004 and 2007, and the authentication means will be referred to as an authentication unit 2008. Such naming of the corresponding components is merely exemplary and is not limited to the terms suggested in the description of the present invention. For example, the units may also be referred to as a decryptor. Although FIG. 14 illustrates an example of the descramblers 2004 and 2007 and the authentication unit 2008 being provided inside the receiving system, each of the descramblers 2004 and 2007 and the authentication unit 2008 may also be separately provided in an internal or external module. Herein, the module may include a slot type, such as a SD or CF memory, a memory stick type, a USB type, and so on, and may be detachably fixed to the receiving system.

As described above, when the authentication process is performed successfully by the authentication unit 2008, the scrambled broadcasting contents are descrambled by the descramblers 2004 and 2007, thereby being provided to the user. At this point, a variety of the authentication method and descrambling method may be used herein. However, an agreement on each corresponding method should be made between the receiving system and the transmitting system.

Hereinafter, the authentication and descrambling methods will now be described, and the description of identical components or process steps will be omitted for simplicity.

The receiving system including the authentication unit 2008 and the descramblers 2004 and 2007 will now be described in detail. The receiving system receives the scrambled broadcasting contents through the tuner 2001 and the demodulating unit 2002. Then, the system manager 2015 decides whether the received broadcasting contents have been scrambled. Herein, the demodulating unit 2002 may be included as a demodulating unit according to embodiments of the present invention as described in FIG. 9. However, the present invention is not limited to the examples given in the description set forth herein. If the system manager 2015 decides that the received broadcasting contents have been scrambled, then the system manager 2015 controls the system to operate the authentication unit 2008. As described above, the authentication unit 2008 performs an authentication process in order to decide whether the receiving system according to the present invention corresponds to a legitimate host entitled to receive the paid broadcasting service. Herein, the authentication process may vary in accordance with the authentication methods.

For example, the authentication unit 2008 may perform the authentication process by comparing an IP address of an IP datagram within the received broadcasting contents with a specific address of a corresponding host. At this point, the specific address of the corresponding receiving system (or host) may be a MAC address. More specifically, the authentication unit 2008 may extract the IP address from the decapsulated IP datagram, thereby obtaining the receiving system information that is mapped with the IP address. At this point, the receiving system should be provided, in advance, with information (e.g., a table format) that can map the IP address and the receiving system information. Accordingly, the authentication unit 2008 performs the authentication process by determining the conformity between the address of the corresponding receiving system and the system information of the receiving system that is mapped with the IP address. In other words, if the authentication unit 2008 determines that the two types of information conform to one another, then the authentication unit 2008 determines that the receiving system is entitled to receive the corresponding broadcasting contents.

In another example, standardized identification information is defined in advance by the receiving system and the transmitting system. Then, the identification information of the receiving system requesting the paid broadcasting service is transmitted by the transmitting system. Thereafter, the receiving system determines whether the received identification information conforms with its own unique identification number, so as to perform the authentication process. More specifically, the transmitting system creates a database for storing the identification information (or number) of the receiving system requesting the paid broadcasting service. Then, if the corresponding broadcasting contents are scrambled, the transmitting system includes the identification information in the EMM, which is then transmitted to the receiving system.

If the corresponding broadcasting contents are scrambled, messages (e.g., entitlement control message (ECM), entitlement management message (EMM)), such as the CAS information, mode information, message position information, that are applied to the scrambling of the broadcasting contents are transmitted through a corresponding data header or anther data packet. The ECM may include a control word (CW) used for scrambling the broadcasting contents. At this point, the control word may be encoded with an authentication key. The EMM may include an authentication key and entitlement information of the corresponding data. Herein, the authentication key may be encoded with a receiving system-specific distribution key. In other words, assuming that the enhanced data are scrambled by using the control word, and that the authentication information and the descrambling information are transmitted from the transmitting system, the transmitting system encodes the CW with the authentication key and, then, includes the encoded CW in the entitlement control message (ECM), which is then transmitted to the receiving system. Furthermore, the transmitting system includes the authentication key used for encoding the CW and the entitlement to receive data (or services) of the receiving system (i.e., a standardized serial number of the receiving system that is entitled to receive the corresponding broadcasting service or data) in the entitlement management message (EMM), which is then transmitted to the receiving system.

Accordingly, the authentication unit 2008 of the receiving system extracts the identification information of the receiving system and the identification information included in the EMM of the broadcasting service that is being received. Then, the authentication unit 2008 determines whether the identification information conform to each other, so as to perform the authentication process. More specifically, if the authentication unit 2008 determines that the information conform to each other, then the authentication unit 2008 eventually determines that the receiving system is entitled to receive the request broadcasting service.

In yet another example, the authentication unit 2008 of the receiving system may be detachably fixed to an external module. In this case, the receiving system is interfaced with the external module through a common interface (CI). In other words, the external module may receive the data scrambled by the receiving system through the common interface, thereby performing the descrambling process of the received data. Alternatively, the external module may also transmit only the information required for the descrambling process to the receiving system. The common interface is configured on a physical layer and at least one protocol layer. Herein, in consideration of any possible expansion of the protocol layer in a later process, the corresponding protocol layer may be configured to have at least one layer that can each provide an independent function.

The external module may either consist of a memory or card having information on the key used for the scrambling process and other authentication information but not including any descrambling function, or consist of a card having the above-mentioned key information and authentication information and including the descrambling function. Both the receiving system and the external module should be authenticated in order to provide the user with the paid broadcasting service provided (or transmitted) from the transmitting system. Therefore, the transmitting system can only provide the corresponding paid broadcasting service to the authenticated pair of receiving system and external module.

Additionally, an authentication process should also be performed between the receiving system and the external module through the common interface. More specifically, the module may communicate with the system manager 2015 included in the receiving system through the common interface, thereby authenticating the receiving system. Alternatively, the receiving system may authenticate the module through the common interface. Furthermore, during the authentication process, the module may extract the unique ID of the receiving system and its own unique ID and transmit the extracted IDs to the transmitting system. Thus, the transmitting system may use the transmitted ID values as information determining whether to start the requested service or as payment information. Whenever necessary, the system manager 2015 transmits the payment information to the remote transmitting system through the telecommunication module 2019.

The authentication unit 2008 authenticates the corresponding receiving system and/or the external module. Then, if the authentication process is successfully completed, the authentication unit 2008 certifies the corresponding receiving system and/or the external module as a legitimate system and/or module entitled to receive the requested paid broadcasting service. In addition, the authentication unit 2008 may also receive authentication-associated information from a mobile telecommunications service provider to which the user of the receiving system is subscribed, instead of the transmitting system providing the requested broadcasting service. In this case, the authentication-association information may either be scrambled by the transmitting system providing the broadcasting service and, then, transmitted to the user through the mobile telecommunications service provider, or be directly scrambled and transmitted by the mobile telecommunications service provider. Once the authentication process is successfully completed by the authentication unit 2008, the receiving system may descramble the scrambled broadcasting contents received from the transmitting system. At this point, the descrambling process is performed by the first and second descramblers 2004 and 2007. Herein, the first and second descramblers 2004 and 2007 may be included in an internal module or an external module of the receiving system.

The receiving system is also provided with a common interface for communicating with the external module including the first and second descramblers 2004 and 2007, so as to perform the descrambling process. More specifically, the first and second descramblers 2004 and 2007 may be included in the module or in the receiving system in the form of hardware, middleware or software. Herein, the descramblers 2004 and 2007 may be included in any one of or both of the module and the receiving system. If the first and second descramblers 2004 and 2007 are provided inside the receiving system, it is advantageous to have the transmitting system (i.e., at least any one of a service provider and a broadcast station) scramble the corresponding data using the same scrambling method.

Alternatively, if the first and second descramblers 2004 and 2007 are provided in the external module, it is advantageous to have each transmitting system scramble the corresponding data using different scrambling methods. In this case, the receiving system is not required to be provided with the descrambling algorithm corresponding to each transmitting system. Therefore, the structure and size of receiving system may be simplified and more compact. Accordingly, in this case, the external module itself may be able to provide CA functions, which are uniquely and only provided by each transmitting systems, and functions related to each service that is to be provided to the user. The common interface enables the various external modules and the system manager 2015, which is included in the receiving system, to communicate with one another by a single communication method. Furthermore, since the receiving system may be operated by being connected with at least one or more modules providing different services, the receiving system may be connected to a plurality of modules and controllers.

In order to maintain successful communication between the receiving system and the external module, the common interface protocol includes a function of periodically checking the status of the opposite correspondent. By using this function, the receiving system and the external module is capable of managing the status of each opposite correspondent. This function also reports the user or the transmitting system of any malfunction that may occur in any one of the receiving system and the external module and attempts the recovery of the malfunction.

In yet another example, the authentication process may be performed through software. More specifically, when a memory card having CAS software downloaded, for example, and stored therein in advanced is inserted in the receiving system, the receiving system receives and loads the CAS software from the memory card so as to perform the authentication process. In this example, the CAS software is read out from the memory card and stored in the first memory 2012 of the receiving system. Thereafter, the CAS software is operated in the receiving system as an application program. According to an embodiment of the present invention, the CAS software is mounted on (or stored) in a middleware platform and, then executed. A Java middleware will be given as an example of the middleware included in the present invention. Herein, the CAS software should at least include information required for the authentication process and also information required for the descrambling process.

Therefore, the authentication unit 2008 performs authentication processes between the transmitting system and the receiving system and also between the receiving system and the memory card. At this point, as described above, the memory card should be entitled to receive the corresponding data and should include information on a normal receiving system that can be authenticated. For example, information on the receiving system may include a unique number, such as a standardized serial number of the corresponding receiving system. Accordingly, the authentication unit 2008 compares the standardized serial number included in the memory card with the unique information of the receiving system, thereby performing the authentication process between the receiving system and the memory card.

If the CAS software is first executed in the Java middleware base, then the authentication between the receiving system and the memory card is performed. For example, when the unique number of the receiving system stored in the memory card conforms to the unique number of the receiving system read from the system manager 2015, then the memory card is verified and determined to be a normal memory card that may be used in the receiving system. At this point, the CAS software may either be installed in the first memory 2012 upon the shipping of the present invention, or be downloaded to the first memory 2012 from the transmitting system or the module or memory card, as described above. Herein, the descrambling function may be operated by the data broadcasting application manger 2016 as an application program.

Thereafter, the CAS software parses the EMM/ECM packets outputted from the demultiplexer 2003, so as to verify whether the receiving system is entitled to receive the corresponding data, thereby obtaining the information required for descrambling (i.e., the CW) and providing the obtained CW to the descramblers 2004 and 2007. More specifically, the CAS software operating in the Java middleware platform first reads out the unique (or serial) number of the receiving system from the corresponding receiving system and compares it with the unique number of the receiving system transmitted through the EMM, thereby verifying whether the receiving system is entitled to receive the corresponding data. Once the receiving entitlement of the receiving system is verified, the corresponding broadcasting service information transmitted to the ECM and the entitlement of receiving the corresponding broadcasting service are used to verify whether the receiving system is entitled to receive the corresponding broadcasting service. Once the receiving system is verified to be entitled to receive the corresponding broadcasting service, the authentication key transmitted to the EMM is used to decode (or decipher) the encoded CW, which is transmitted to the ECM, thereby transmitting the decoded CW to the descramblers 2004 and 2007. Each of the descramblers 2004 and 2007 uses the CW to descramble the broadcasting service.

Meanwhile, the CAS software stored in the memory card may be expanded in accordance with the paid service which the broadcast station is to provide. Additionally, the CAS software may also include other additional information other than the information associated with the authentication and descrambling. Furthermore, the receiving system may download the CAS software from the transmitting system so as to upgrade (or update) the CAS software originally stored in the memory card. As described above, regardless of the type of broadcast receiving system, as long as an external memory interface is provided, the present invention may embody a CAS system that can meet the requirements of all types of memory card that may be detachably fixed to the receiving system. Thus, the present invention may realize maximum performance of the receiving system with minimum fabrication cost, wherein the receiving system may receive paid broadcasting contents such as broadcast programs, thereby acknowledging and regarding the variety of the receiving system. Moreover, since only the minimum application program interface is required to be embodied in the embodiment of the present invention, the fabrication cost may be minimized, thereby eliminating the manufacturer's dependence on CAS manufacturers. Accordingly, fabrication costs of CAS equipments and management systems may also be minimized.

Meanwhile, the descramblers 2004 and 2007 may be included in the module either in the form of hardware or in the form of software. In this case, the scrambled data that being received are descrambled by the module and then demodulated. Also, if the scrambled data that are being received are stored in the third memory 2018, the received data may be descrambled and then stored, or stored in the memory at the point of being received and then descrambled later on prior to being played (or reproduced). Thereafter, in case scramble/descramble algorithms are provided in the storage controller 2017, the storage controller 2017 scrambles the data that are being received once again and then stores the re-scrambled data to the third memory 2018.

In yet another example, the descrambled broadcasting contents (transmission of which being restricted) are transmitted through the broadcasting network. Also, information associated with the authentication and descrambling of data in order to disable the receiving restrictions of the corresponding data are transmitted and/or received through the telecommunications module 2019. Thus, the receiving system is able to perform reciprocal (or two-way) communication. The receiving system may either transmit data to the telecommunication module within the transmitting system or be provided with the data from the telecommunication module within the transmitting system. Herein, the data correspond to broadcasting data that are desired to be transmitted to or from the transmitting system, and also unique information (i.e., identification information) such as a serial number of the receiving system or MAC address.

The telecommunication module 2019 included in the receiving system provides a protocol required for performing reciprocal (or two-way) communication between the receiving system, which does not support the reciprocal communication function, and the telecommunication module included in the transmitting system. Furthermore, the receiving system configures a protocol data unit (PDU) using a tag-length-value (TLV) coding method including the data that are to be transmitted and the unique information (or ID information). Herein, the tag field includes indexing of the corresponding PDU. The length field includes the length of the value field. And, the value field includes the actual data that are to be transmitted and the unique number (e.g., identification number) of the receiving system.

The receiving system may configure a platform that is equipped with the Java platform and that is operated after downloading the Java application of the transmitting system to the receiving system through the network. In this case, a structure of downloading the PDU including the tag field arbitrarily defined by the transmitting system from a storage means included in the receiving system and then transmitting the downloaded PDU to the telecommunication module 2019 may also be configured. Also, the PDU may be configured in the Java application of the receiving system and then outputted to the telecommunication module 2019. The PDU may also be configured by transmitting the tag value, the actual data that are to be transmitted, the unique information of the corresponding receiving system from the Java application and by performing the TLV coding process in the receiving system. This structure is advantageous in that the firmware of the receiving system is not required to be changed even if the data (or application) desired by the transmitting system is added.

The telecommunication module within the transmitting system either transmits the PDU received from the receiving system through a wireless data network or configures the data received through the network into a PDU which is transmitted to the host. At this point, when configuring the PDU that is to be transmitted to the host, the telecommunication module within the transmitting end may include unique information (e.g., IP address) of the transmitting system which is located in a remote location. Additionally, in receiving and transmitting data through the wireless data network, the receiving system may be provided with a common interface, and also provided with a WAP, CDMA 1x EV-DO, which can be connected through a mobile telecommunication base station, such as CDMA and GSM, and also provided with a wireless LAN, mobile internet, WiBro, WiMax, which can be connected through an access point. The above-described receiving system corresponds to the system that is not equipped with a telecommunication function. However, a receiving system equipped with telecommunication function does not require the telecommunication module 2019.

The broadcasting data being transmitted and received through the above-described wireless data network may include data required for performing the function of limiting data reception. Meanwhile, the demultiplexer 2003 receives either the real-time data outputted from the demodulating unit 2002 or the data read from the third memory 2018, thereby performing demultiplexing. In this embodiment of the present invention, the demultiplexer 2003 performs demultiplexing on the enhanced data packet. Similar process steps have already been described earlier in the description of the present invention. Therefore, a detailed of the process of demultiplexing the enhanced data will be omitted for simplicity.

The first descrambler 2004 receives the demultiplexed signals from the demultiplexer 2003 and then descrambles the received signals. At this point, the first descrambler 2004 may receive the authentication result received from the authentication unit 2008 and other data required for the descrambling process, so as to perform the descrambling process. The audio decoder 2005 and the video decoder 2006 receive the signals descrambled by the first descrambler 2004, which are then decoded and outputted. Alternatively, if the first descrambler 2004 did not perform the descrambling process, then the audio decoder 2005 and the video decoder 2006 directly decode and output the received signals. In this case, the decoded signals are received and then descrambled by the second descrambler 2007 and processed accordingly.

As described above, the digital broadcasting systems and methods of processing broadcast data according to the present invention have the following advantages. More specifically, the digital broadcasting receiving system and method of processing broadcast data according to the present invention is highly protected against (or resistant to) any error that may occur when transmitting supplemental data through a channel. And, the present invention is also highly compatible to the conventional receiving system. Moreover, the present invention may also receive the supplemental data without any error even in channels having severe ghost effect and noise.

Additionally, when a known data sequence is inputted to a trellis encoder, by having the transmitting system initialize a memory within the trellis encoder and trellis-encode the inputted data, thereby outputted the processed data, and by having the receiving system estimate known data information, which is to be used for frequency synchronization, symbol timing synchronization, frame synchronization, and channel equalization, the receiving performance of the receiving system may be enhanced in a situation undergoing severe and frequent channel changes. Furthermore, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital television (DTV) receiving system for processing digital broadcast data, the DTV receiving system comprising:
    a tuner for receiving a broadcast signal including a data group, the data group comprising enhanced data, known data sequences, and signaling information, wherein at least two of the known data sequences are spaced 16 segments apart, wherein an ith segment in the data group has main data and M consecutive enhanced data bytes, an (i+1)th segment in the data group has main data and L consecutive enhanced data bytes, and an (i+2)th segment in the data group has main data and K consecutive enhanced data bytes, and wherein M<L<K;
    a demodulator for demodulating the broadcast signal;
    an equalizer for compensating a channel distortion of the demodulated broadcast signal using at least one of the known data sequences;
    an inner decoder for inner decoding the equalized broadcast signal; and
    an outer decoder for outer decoding the inner-decoded broadcast signal.

2. The DTV receiving system of claim 1, wherein the data group comprises a plurality of regions, wherein each region comprises at least one segment, wherein enhanced data included in at least a first region of the plurality of regions are received by being encoded at a coding rate of 1/X, and wherein enhanced data included in at least a second region of the plurality of regions are received by being encoded at a coding rate of 1/Y, wherein X≠Y.

3. The DTV receiving system of claim 2, wherein a value of X is equal to 2, and a value of Y is equal to 4.

4. The DTV receiving system of claim 1, wherein the main data are received by being Reed Solomon (RS)-encoded with a systematic RS encoding scheme and the enhanced data are received by being RS-encoded with a non-systematic RS encoding scheme.

5. A method of processing digital broadcast data in a digital television (DTV) receiving system, the method comprising:
  receiving, by a tuner, a broadcast signal including a data group, the data group comprising enhanced data, known data sequences and signaling information, wherein at least two of the known data sequences are spaced 16 segments apart, wherein an ith segment in the data group has main data and M consecutive enhanced data bytes, an (i+1)th segment in the data group has main data and L consecutive enhanced data bytes, and an (i+2)th segment in the data group has main data and K consecutive enhanced data bytes, and wherein M<L<K;
  demodulating, by a demodulator, the broadcast signal;
  compensating, by an equalizer, a channel distortion of the demodulated broadcast signal using at least one of the known data sequences to generate an equalized broadcast signal;
  inner decoding, by an inner decoder, the equalized broadcast signal; and
  outer decoding, by an outer decoder, the inner-decoded broadcast signal.

6. The method of claim 5, wherein the data group comprises a plurality of regions, wherein each region comprises at least one segment, wherein enhanced data included in at least a first region of the plurality of regions are received by being encoded at a coding rate of 1/X, and wherein enhanced data included in at least a second region of the plurality of regions are received by being encoded at a coding rate of 1/Y, wherein X≠Y.

7. The method of claim 6, wherein a value of X is equal to 2, and a value of Y is equal to 4.

8. The method of claim 7, wherein the main data are received by being Reed Solomon (RS)-encoded with a systematic RS encoding scheme and the enhanced data are received by being RS-encoded with a non-systematic RS encoding scheme.

* * * * *